(12) United States Patent
Yie

(10) Patent No.: US 9,587,776 B2
(45) Date of Patent: Mar. 7, 2017

(54) METHOD AND APPARATUS FOR GENERATING SELF ROTATING FLUID JET

(71) Applicant: Gene G. Yie, Grants Pass, OR (US)

(72) Inventor: Gene G. Yie, Grants Pass, OR (US)

(*) Notice: Subject to any disclaimer, the term of this patent is extended or adjusted under 35 U.S.C. 154(b) by 137 days.

(21) Appl. No.: 14/171,360

(22) Filed: Feb. 3, 2014

(65) Prior Publication Data

US 2015/0217305 A1    Aug. 6, 2015

(51) Int. Cl.
*B05B 3/04* (2006.01)
*F16L 27/02* (2006.01)
*B24C 3/12* (2006.01)
*B24C 7/00* (2006.01)
*B05B 1/14* (2006.01)
*B05B 3/06* (2006.01)
*B08B 3/02* (2006.01)
*B08B 9/043* (2006.01)
*B08B 9/049* (2006.01)
*B24C 1/04* (2006.01)
*B24C 5/04* (2006.01)
*B26F 3/00* (2006.01)
*B05B 13/06* (2006.01)

(52) U.S. Cl.
CPC .............. *F16L 27/023* (2013.01); *B05B 1/14* (2013.01); *B05B 3/0463* (2013.01); *B05B 3/06* (2013.01); *B08B 3/02* (2013.01); *B08B 9/0433* (2013.01); *B08B 9/0495* (2013.01); *B24C 1/045* (2013.01); *B24C 3/12* (2013.01); *B24C 5/04* (2013.01); *B24C 7/0023* (2013.01); *B26F 3/004* (2013.01); *B05B 13/0636* (2013.01)

(58) Field of Classification Search
CPC ........ F16L 27/023; B05B 1/14; B05B 3/0463; B05B 3/06; B05B 3/02; B05B 9/0433; B05B 9/0495; B05B 13/0636; B24C 3/12; B24C 7/0023; B08B 3/02; B08B 9/0433; B08B 9/0495
USPC ..... 239/237, 240, 227, 251, 263, 263.3, 554
See application file for complete search history.

(56) References Cited

U.S. PATENT DOCUMENTS

| 5,395,053 | A | * | 3/1995 | Frech | .................... | B05B 3/0463 239/237 |
| 6,736,333 | B2 | * | 5/2004 | Binder | .................. | B05B 3/0463 239/251 |
| 7,273,188 | B2 | * | 9/2007 | Saha | ........................ | F01D 5/14 239/237 |
| 8,820,659 | B2 | * | 9/2014 | Wesch | ..................... | B08B 3/02 239/237 |

* cited by examiner

Primary Examiner — Steven J Ganey
(74) Attorney, Agent, or Firm — Pauley Erickson & Kottis

(57) ABSTRACT

A nozzle assembly for generating fluid jets, such as self-spinning fluid jets. A nozzle body includes a cylindrical nozzle cavity, an inlet, an outlet, and a tubular nozzle rotor assembly positioned with respect to the nozzle cavity. The nozzle rotor assembly can have a ball end and a tubular end and a central fluid passage routed through the nozzle rotor assembly. A fluid swirl enhancer forms communication with the inlet. A replaceable nozzle seat forms communication with the ball end of the nozzle rotor assembly and with the outlet. The ball end of the nozzle rotor assembly pivots, oscillates and rotates against the nozzle seat when pressurized fluid flows through the nozzle assembly.

20 Claims, 20 Drawing Sheets

ORBITAL *Idrojet*®

|  | F1 | F2 | F3 |
|---|---|---|---|
| Pressure, P (bar) Max | 1500 | 1000 | 700 |
| Flow rate, Q (l/min) | 98 | 80 | 67 |
| Thread, d | M14 x 1,5L | 3/8" G | 3/8" G-1/2" G |
| Dimension D x L (mm x mm) | 50 x 134 | 50 x 134 | |
| Spraying angle | α = | 10° | ; 20° |
| Weight (kg) | 1,2 | 1,2 | 0,7 |

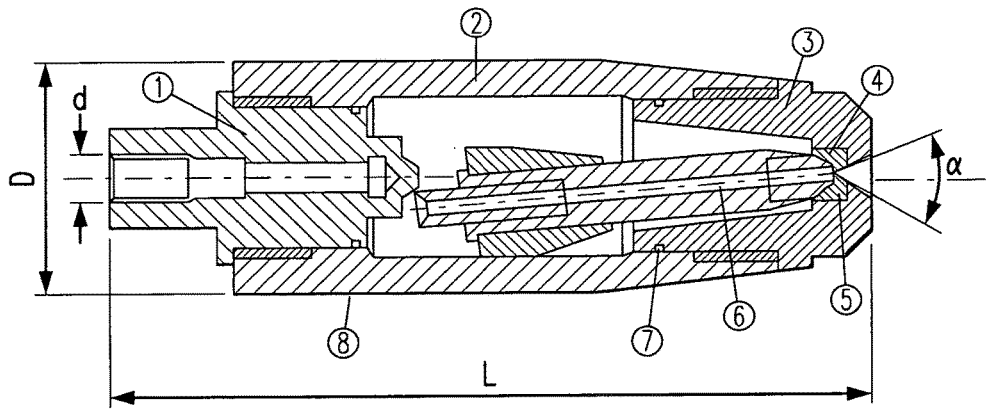

CHARACTERISTICS

| 1 | 2 | 3 | 4 | 5 | 6 | 7-8 |
|---|---|---|---|---|---|---|
| Cover | Pressure casing | Head | Seat | O-ring | Rotor | Gasket unit |

Applications: Concrete Cleaning and Hydrodemolition, Casting Cleaning, Offshore Oil and Gas Platforms, Ship's Hull Cleaning, Airport Runway Cleaning, Scale Removal, Building and Sewer Cleaning, Root Cutting and Many Others

FIG. 1
(PRIOR ART)

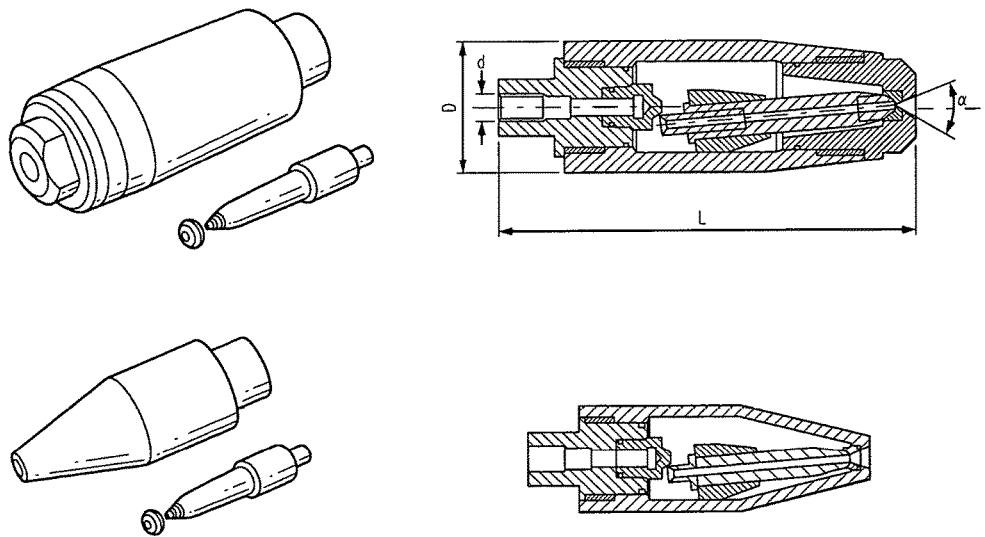

High Performance:
- High Performance, high production.
- Lightweight, simple to operate and maintain.
- Combines the power of a solid pencil jet with the large area coverage of a fan jet.
- Rugged and dependable.
- Rotor and insert assemblies are specific to your exact flow and pressure requirement.
- Hardened steel protection cover available for concrete demolition.

Applications:
- Concrete cleaning and Hydrodemolition.
- Casting cleaning.
- Scale removal.
- Surface preparation.
- Offshore cleaning.
- Root cutting.

| Nozzle Type | Thread | Dimensions (mm) | Spraying Angle | Water Temperature | Weight (kg) | Working Pressure max. bar/PSI |
|---|---|---|---|---|---|---|
| F25 | M14 x 1,5L | 50 x 134 | $\alpha = 20°$ | 80°C | 1.3 | 2,500/36,000 |
| F1 | M14 x 1,5L | 50 x 134 | $\alpha = 20°$ | 80°C | 1.2 | 1,500/20,000 |
| F2 | 3/8" BSP | 50 x 134 | $\alpha = 20°$ | 80°C | 1.2 | 1,000/14,500 |
| F3 | 3/8" BSP – 1/2" BSP | 43 x 130 | $\alpha = 20°$ | 80°C | 0.7 | 700/10,000 |
| F4 | 3/8" BSP – 1/2" BSP | 43 x 109 | $= 22°$ | 80°C | 0.65 | 500/7,250 |

FIG. 2
(PRIOR ART)

SALO-JET
High Performance Orbital Jet Nozzles
Pressures from 10,000 - 36,000 PSI

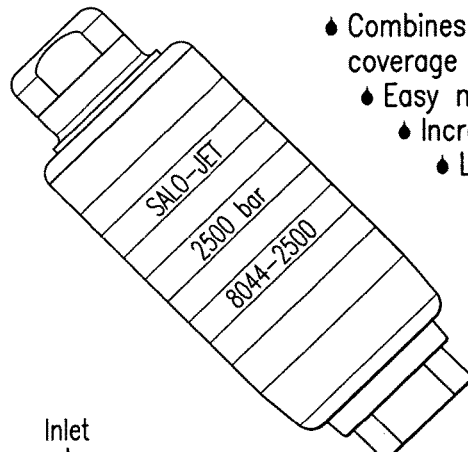

- Combines the power of a solid jet with the coverage of fan jet.
- Easy maintenance, simple field overhaul
- Increased productiviy
- Light weight, simple to operate

*Application/Features:*

Gardner Denver Water Jetting Systems proudly offers the Salo-Jet Orbital Jet Nozzle for waterjet cleaning and surface preparation applications.

The Salo-Jet's jets are directed at a 20° angle for broad coverage to increase the production rate over many standard blast nozzles on the market. It effectively combines rotation plus the power of a solid jet and the coverage area of a fan jet. The Salo-Jet is quickly field overhauled by changing its rotor and seat. Each Salo-Jet is shipped fuly tested and certified in its own case.

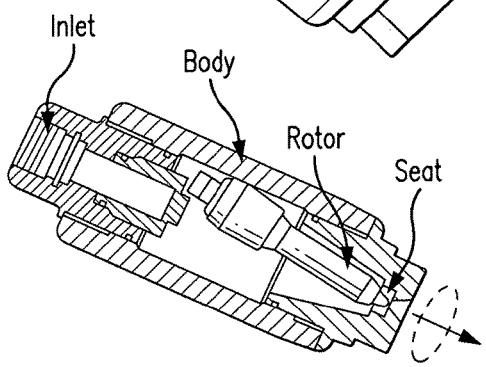

Ideal for use in:
- Concrete cleaning and hydrodemolition
- Casting cleaning
- Scale removal
- Surface preparation
- Offshore cleaning

| ITEM | MAWP | INLET | DIMENSIONS | WEIGHT | PART # |
|---|---|---|---|---|---|
| SALO-JET 800 | 10 KPSI/800 Bar | 3/8" or 1/2" MP | 1-3/4" x 5-1/8" / 43 x 130 mm | 1.5 Lbs./0.7 Kg | 8044.80 |
| SALO-JET 1500 | 20 KPSI/1500 Bar | 9/16" MP | 2" x 5-1/4" / 50 x 134 mm | 2.6 Lbs./1.2 Kg | 8044.15 |
| SALO-JET 2500 | 36 KPSI/2500 Bar | 9/16" HP | 2" x 5-1/4" / 50 x 134 mm | 2.6 Lbs./1.2 Kg | 8044.25 |

GARDNER DENVER WATER JETTING SYSTEMS, INC.
Partek • Liqua-Blaster • Geoquip • CRS Power Flow • Jetting Systems • American Waterblaster
800-231-3628 • 281-448-5800 • Fax 281-448-7500
www.waterjetting.com • mktg.wjs@gardnerdenver.com

FIG. 3
(PRIOR ART)

METHOD AND APPARATUS FOR GENERATING SELF ROTATING FLUID JET

BACKGROUND OF THE INVENTION

Fluid jets, such as water jets, generated at relatively high static pressures with a suitable pump and nozzle travel in or through air at a relatively high speed. Such high-speed water-jets, often greater than sonic velocity, are conventionally used in many industrial and commercial processes, such as surface cleaning and preparation, coating removal, ship-hull barnacle removal, and concrete scarification and demolition. In such applications, the productivity of the process is measured by how well and how fast the water-jets are applied to the surface. To maximize the surface coverage of the water-jets, the water-jet nozzle is moved over the surface by hand with a hand tool or by an automated or manual mechanical system to provide the desired nozzle movement. The water jet nozzle or nozzles are often rotated and then moved linearly on the surface. To provide the rotation, the nozzles are attached to a suitable swivel or rotary joint that allows pressurized fluid to be transported from a stationary conduit to a rotating conduit, and the rotation is powered with a suitable motor. The entire system is then linearly moved with a traversing system, such as a vehicle. This process is carried out today in airport runway cleaning in which a large amount of water is consumed and the speed of the process is important. A similar process is applied today in removing marine growth from a ship hull. In both applications, the speed of operation is critical and the productivity is related to or a function of the pressure and flow rate of the water-jets and the movement of the nozzle systems.

In conventional water-jet processes, the water pressure is commonly in thousands of pound per square inch (psi) in household jet wash apparatuses, and tens of thousands of psi in industrial applications. For example, in cleaning heat exchanger tubes and oil well drilling pipes, the water pressure is typically above 20,000 psi and the nozzle rotating speed can reach 1000 revolutions per minute (rpm). In known shipyard barnacle removing processes, the water pressure can exceed 50,000 psi and the rotation speed above 2000 rpm. In such applications, the pump required to provide the desired pressure is no longer a problem and is widely available today, it is the nozzle motion system that becomes important.

At relatively high fluid pressures and relatively high rotation speed, the rotary joint must provide the desired rotary motion and satisfactory fluid sealing. The reliability of the rotating shaft and its dynamic seals are a common concern. As a result, high-pressure high-speed rotary joints are costly and are high-maintenance components, and are avoided if possible.

U.S. Pat. No. 5,794,854 teaches a method of providing linear and orbital movement to a water jet nozzle at high water pressures without the need for a rotary joint. In this prior art, the tube or hose between its anchor and the nozzle is subjected to a prescribed oscillating motion, linearly or orbitally. Water hose and small tubes are ductile enough to accept the applied movement. Thus, a rotary joint is no longer needed. But a motion-generating apparatus must be added to the nozzle system. As a result, a complete nozzle system of this type is rather bulky and complicated.

Another prior art device available for decades is a simple nozzle that provides orbitally oscillating fluid jets at moderate pressures. These nozzles are known as Idrojet (see FIG. 1), Monro Jet (see FIG. 2), and Salo-Jet nozzle (see FIG. 3). In these known nozzles, a pivotally oscillating rotor shaft sends the pressurized fluid from the nozzle chamber through a nozzle orifice to the outside. The oscillating motion of the rotor assembly is provided by the fluid motion inside the nozzle chamber, thus requiring no external power. These nozzles are common and are widely used in current water jet processes at low and moderate water pressures, commonly referred to as jet washer pressures. However, recent attempts have been made to bring up the pressure capability of these orbital nozzles.

These orbital nozzles share a common design and often appear in the shape of a bulb. In applications, the nozzle often shakes excessively due to the orbital jet motion and attempts have been made to isolate such undesirable nozzle shaking motion. One example is shown in International Patent Application WO91/16989 that teaches springs and an external housing to isolate the nozzle shake. The shaking motion of these nozzles is caused by several factors, including the slow orbital motion of the rotor and the jet. In current water-jetting applications, the speed of the water jet motion is critical to high productivity. The three commercially available orbital nozzles cited here all have these related shortcomings.

The quality of the water-jet is another issue that available orbital nozzles fail to address fully. For high productivity at high pressures, the water-jet must be produced with high precision jewel-quality orifices in order to produce coherent and long-lasting water-jets. The size of the orifices determines the energy delivered to the surface and may have to be changed often in an operation. Thus, the ease of changing the nozzle is also connected to high productivity. The commercially available orbital nozzles all use drilled metal orifices and changing the orifice size requires replacement of the entire rotor assembly, that is both inconvenient and not cost effective.

SUMMARY OF THE INVENTION

One object of this invention is to provide a pivotally rotating jet (PRJ) fluid jet nozzle that provides greater fluid jet spinning or rotating speed to increase the surface-coverage capability, rotating fluid jets of greater capabilities by using high-quality orifices, improved fluid sealing in the nozzle and thus improved pressure capabilities, improved tool inventory and field operation ease, and a nozzle with greater overall capability and versatility.

The pivotally rotating nozzle of this invention follows one principle of generating spinning motion in a hollow tubular rotor that has a smooth tip pivoting against a coned nozzle seat. A swirling fluid entering into the nozzle chamber can cause the tubular rotor to spin around the nozzle chamber with its downstream end pivoting against the nozzle exit. The fluid can flow through the hollow tube and exit in the form of a fluid jet. In some embodiments of this invention, a nozzle orifice is provided at the pivot of the rotor. The rotor pivot provides smooth motion and fluid sealing under pressure which this invention provides at a high precision level.

BRIEF DESCRIPTION OF THE DRAWINGS

The technical features and other features of this invention will be more apparent when the specification is read in view of the drawings, wherein:

FIGS. 1-3 each describes a conventional nozzle that produces orbitally oscillating fluid jets at moderate pressures;

DETAILED DISCUSSION OF INVENTION

Figure 4:
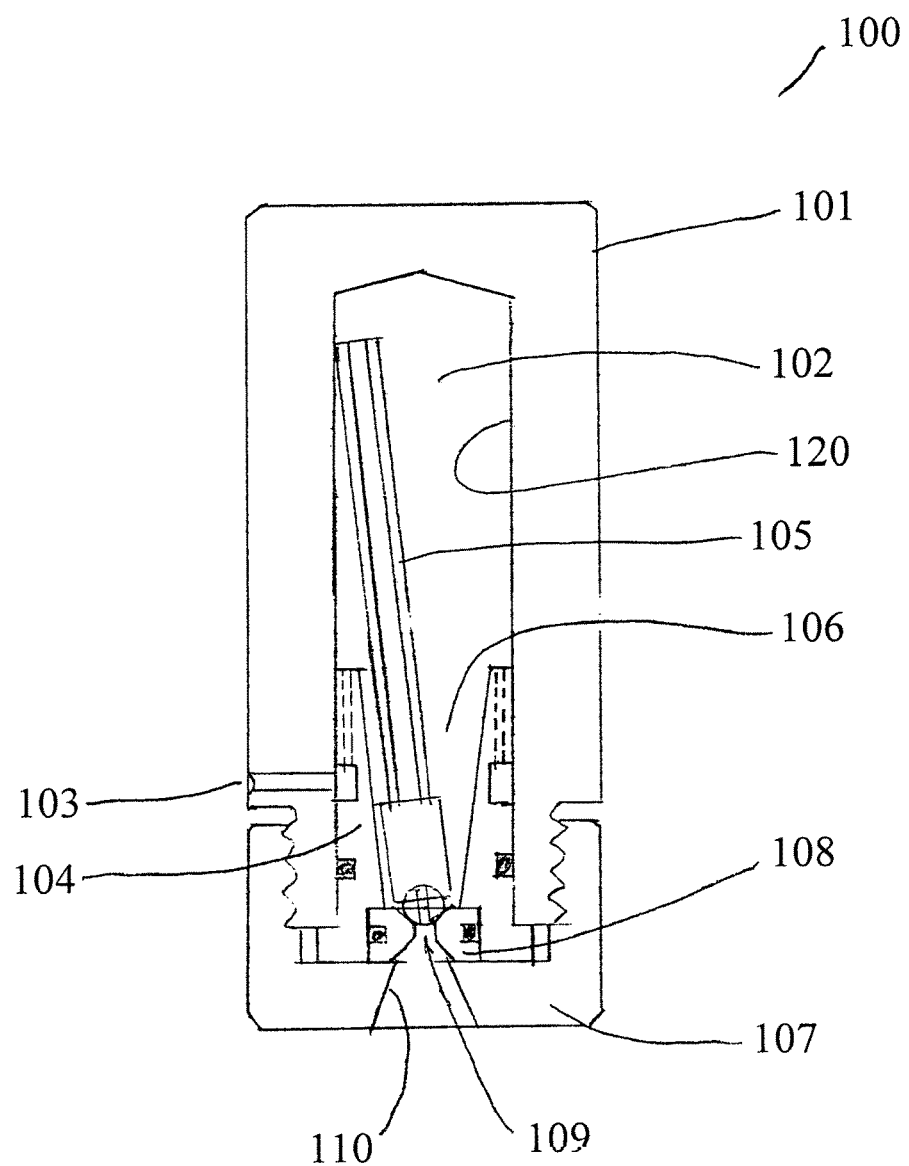
FIG. 4 is a cross-sectional view of a pivotally rotating jet nozzle assembly, according to one embodiment of this invention.

Referring to FIG. 4, one embodiment of this invention is a pivotally rotating fluid jet (PRJ) nozzle assembly 100 constructed to produce pivotally spinning fluid jets at relatively high pressures and relatively high speeds. Nozzle assembly 100 comprises nozzle body 101 with cylindrical chamber 102 connected to side fluid inlet 103, inlet end plug 104 in fluidic communication with fluid inlet 103 and situated or positioned near or at the outlet end of chamber 102, tubular rotor assembly 105 inside chamber 103 and situated or positioned in the middle of center cavity 106 of inlet end plug 104, nozzle cap 107 attached to nozzle body 101 by threads, and nozzle seat 108 having central nozzle exit hole 109 in fluidic communication with central hole 110 of nozzle cap 107.

Figure 5:
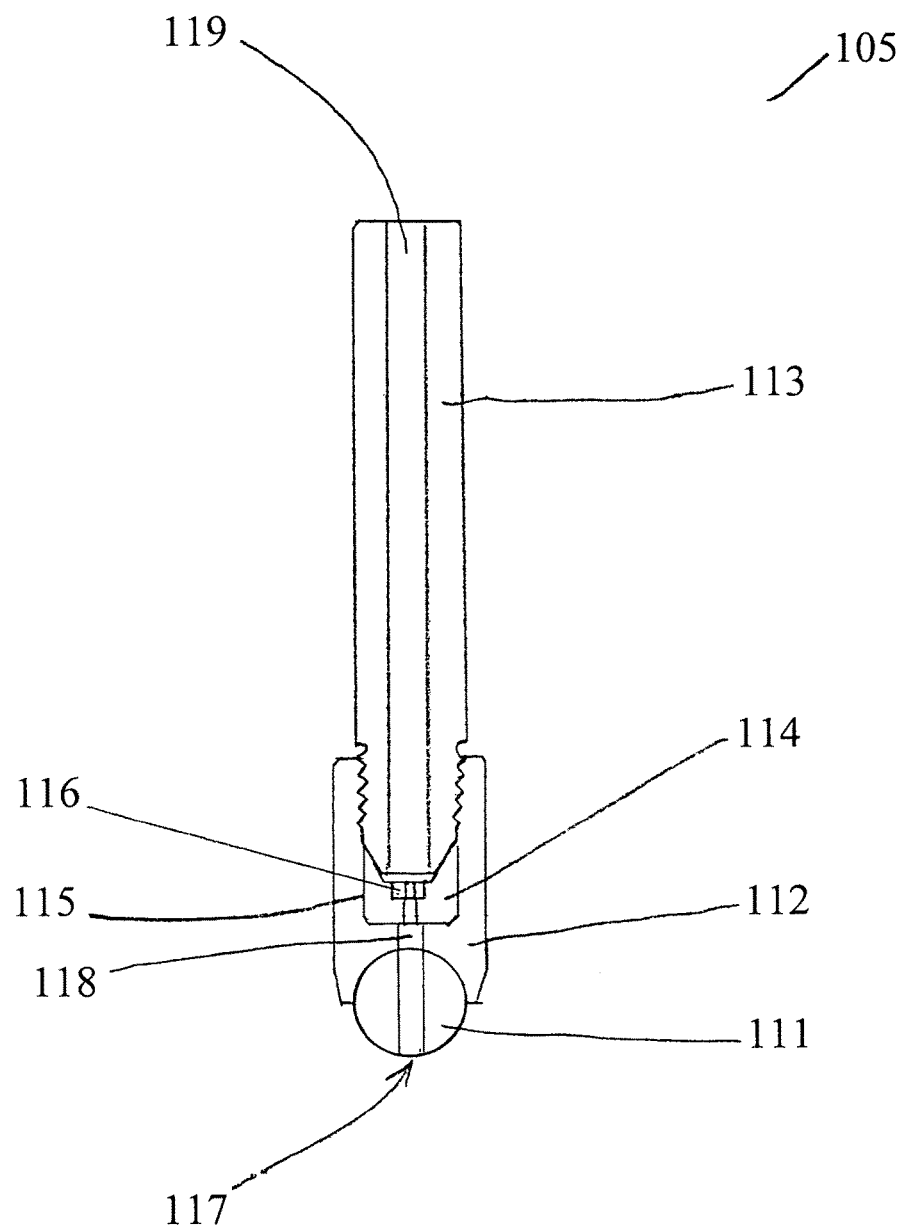
FIG. 5 is a cross-sectional view of a rotor assembly, according to one embodiment of this invention.

Referring to FIG. 5, rotor assembly 105 of nozzle assembly 100 of this invention serves an important function of producing the spinning fluid jet. In some embodiments of this invention, rotor assembly 105 comprises rotor ball 111 hard soldered or otherwise mechanically attached to ball anchor 112, hollow rotor tube 113 attached to ball anchor 112 by threads, and orifice cone or plug 114 situated inside or positioned within ball anchor cavity 115 and sealably in contact with rotor tube 113. In some embodiments of this invention, orifice cone 114 has a jewel-quality orifice 116. Rotor ball 111 has a central fluid passage 117 in-line or aligned with central fluid passage 118 of ball anchor 112 and jewel orifice 116 of orifice cone 114. When assembled, rotor assembly 105 is situated in or positioned near the center of nozzle chamber 101 with tubular end 119 in contact with chamber wall 120 and rotor ball 111 in contact with nozzle seat 108.

Figure 6:
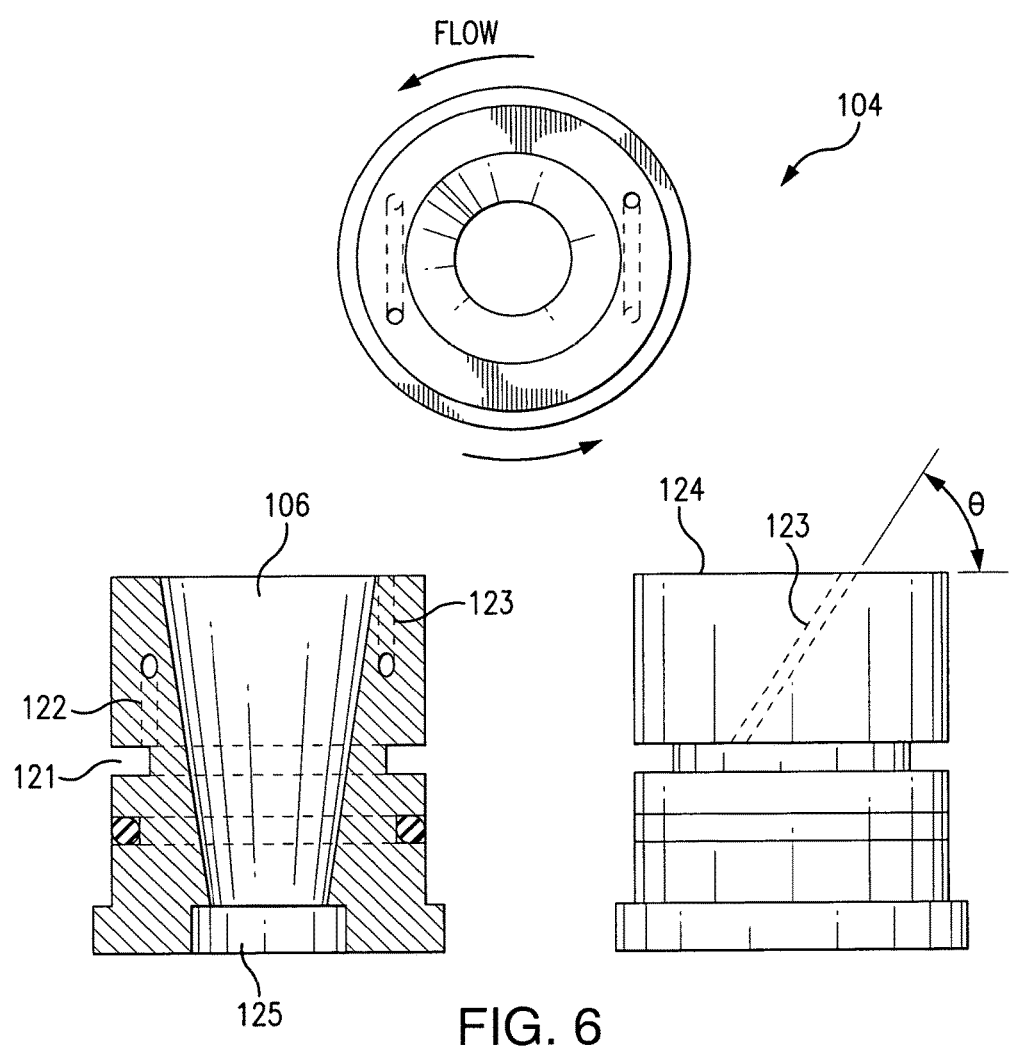
FIG. 6 is a cross-sectional view, a side view and a top view of an inlet end plug, according to one embodiment of this invention.

FIG. 6 shows one embodiment of this invention in which inlet end plug 104 of nozzle assembly 100 is also a major component of nozzle assembly 100 of this invention and it can be used to generate a swirling fluid flow inside or within nozzle chamber 102, for example to cause rotor assembly 107 to spin or rotate. In some embodiments of this invention, inlet plug 104 is called a swirling generator and has an exterior circumferential fluid passage 121 in communication with fluid inlet 103 on or of nozzle body 101, and a centrally positioned tapered cylindrical cavity 106 for accommodating rotor assembly 105. In some embodiments of this invention, inlet plug 104 comprises two oppositely placed or positioned fluid passages 122 and 123 linking fluid passage 121 to top surface 124 of inlet plug 104. Fluid passages 122 and 123 are slanted at an angle from or with respect to the vertical line for generating a swirling fluid flow inside or within nozzle chamber 102. The swirling fluid flow is either clockwise or counterclockwise, depending on how the two slanted fluid passages 122 and 123 are placed or positioned. In some embodiments of this invention, inlet plug 104 has lower central cavity 125 for accommodating nozzle seat 108 when nozzle assembly 100 is assembled.

In some embodiments of this invention, when a pressurized fluid, such as water, enters into or within nozzle cavity 101 through fluid passages 103, 121, 122 and 123, a swirling fluid flow is generated. The fluid flow first builds internal pressure that forces rotor assembly 105 to line up or align with rotor ball 111 which butts against or makes contact with nozzle exit 109 of nozzle seat 108 and rotor end 119 leans against nozzle chamber wall 120 and a slanted fluid jet is issued or discharged at nozzle exit 110 if rotor assembly 105 is not moving. Because nozzle exit 109 is shaped as a cone and is relatively smooth and is in good mating contact with rotor ball 111, rotor assembly 105 can be forced by the flowing fluid inside or within nozzle chamber 102 to rotate and/or pivot around or about chamber wall 120. In some embodiments of this invention, the rotor assembly spins as it rotates around or about chamber wall 120, which in some embodiments of this invention forms the least resistance motion for rotor ball 111 to move against and/or contact the coned nozzle seat. The swirling of the fluid can influence the rotation of rotor assembly 105 and the design characteristics of rotor assembly 105 can influence how fast it will spin or rotate during each revolution around or about nozzle chamber 102. As a result, the fluid jet issued or discharged outside with respect to nozzle 100 in some embodiments of this invention can rotate at an angle θ to or with respect to the centerline of nozzle assembly 100 and although possibly not visible the fluid jet can also rotate.

Figure 7:
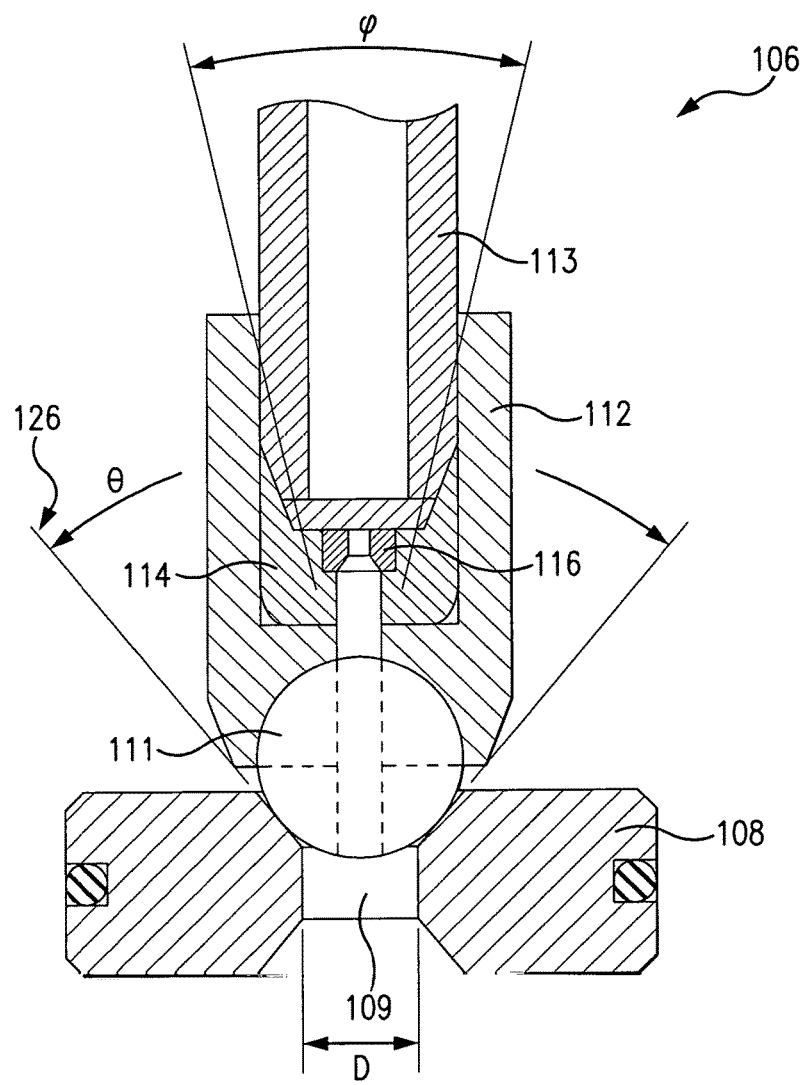
FIG. 7 is a cross-sectional view of a nozzle assembly, according to one embodiment of this invention.

In some embodiments of this invention, such as shown in FIG. 7, to produce a correct or proper fluid jet with nozzle assembly 100 of this invention, the nozzle assembly can be made so that the fluid jet does not touch any part of the nozzle. In some embodiments of this invention, the design of the rotor assembly fits nozzle seat 108 and its corresponding center hole 109. In some embodiments of this invention, taper angle 126 of nozzle exit 109 is selected to support rotor ball 111 and to seal the fluid under pressures. In some embodiments of this invention, taper angle 126 is chosen between about 60 degrees to about 100 degrees. In some embodiments of this invention, nozzle seat 108 is a major part of nozzle assembly 100 and must be made with suitable materials which are preferably but not necessarily consumable and that can be replaced periodically. In some embodiments of this invention, the issued or discharged fluid jet is spread in a cone-shaped pattern and the angle is a function of the inside diameter of chamber 102 and the length of rotor assembly 105. In some embodiments of this invention, because the fluid enters into nozzle assembly 100 of this invention from the bottom of nozzle chamber 102 and flows to the top with the rotation of rotor assembly 105 before entering into rotor tube 105, the fluid flow is relatively smooth and it is important for generating fluid jets of high coherence. Coherent fluid jets are known to be advantageous in cutting applications.

Figure 8:
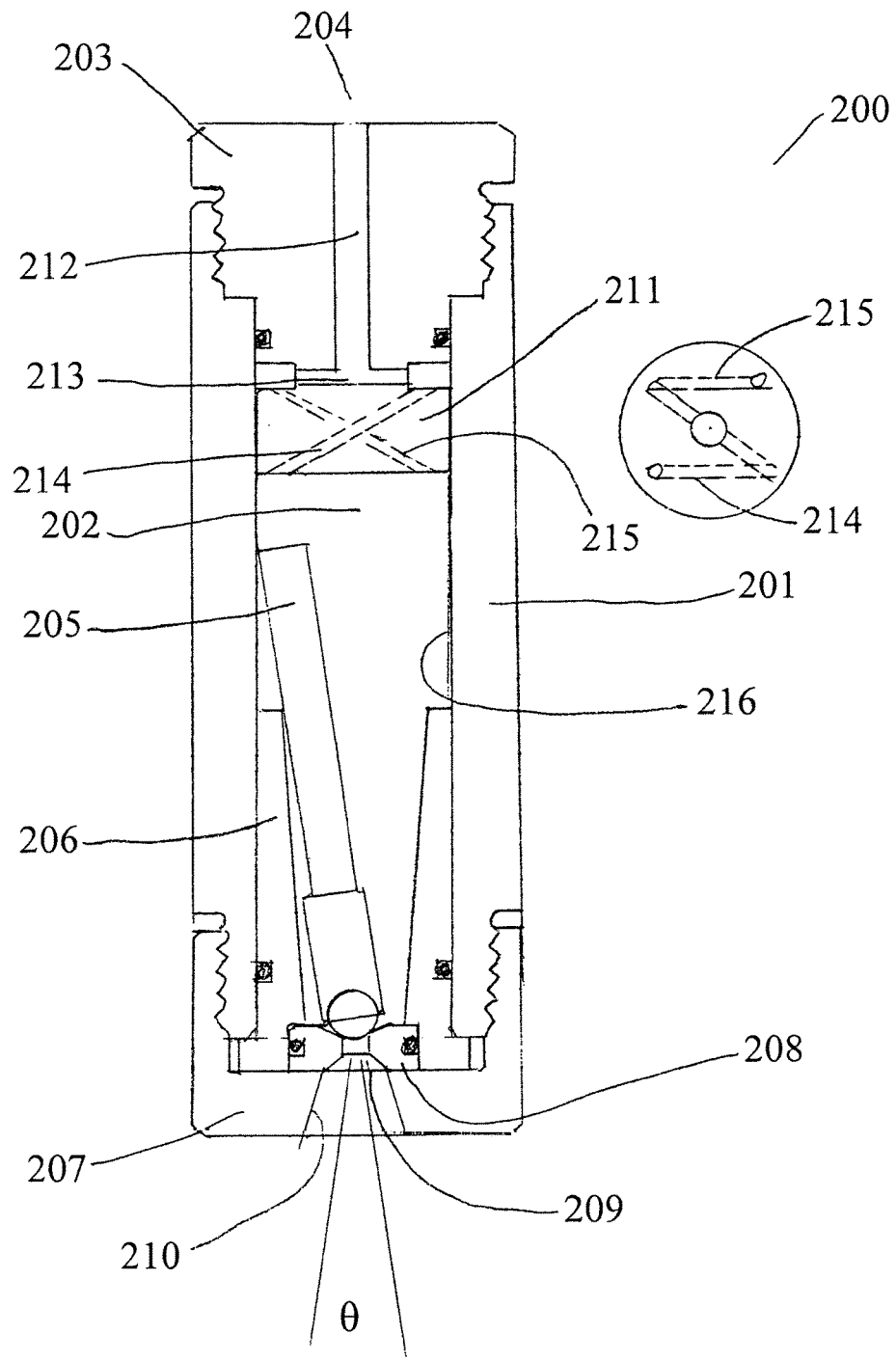
FIG. 8 is a cross-sectional view of a nozzle assembly producing a high-speed pivotally spinning fluid jet, according to one embodiment of this invention.

Referring to FIG. 8, another embodiment of this invention relates to nozzle assembly 200 designed to produce or generate relatively high-speed pivotally spinning fluid jets at relatively high pressures. In some embodiments of this invention, nozzle assembly 200 has a layout to accommodate and comprises nozzle body 201 having cylindrical chamber 202, top end plug 203 having fluid inlet 204, rotor assembly 205, nozzle exit end plug 206, nozzle body bottom end cap 207, nozzle seat 208 situated or positioned in, at and/or near the center of end plug 206 and having center nozzle exit hole 209 in-line or aligned with nozzle body exit 210, and swirling enhancer 211 attached to inlet end plug 203. In some embodiments of this invention, swirling enhancer 211 has fluid passages 212, 213, 214 and 215 designed to route inlet fluid into or within nozzle chamber 202 to produce or generate a desired swirling flow pattern, for example, to rotate rotor assembly 205 pivotally on nozzle seat 206 at a desired speed. In some embodiments of this invention, fluid passages 214 and 215 are slanted at an angle and are placed or positioned on opposite sides of swirling enhancer 211. The opening of slanted passages 214 and 215 and their angle can be changed to produce the desired flow pattern. In some embodiments of this invention, rotor assembly 205 rotates at a relatively high speed but not too high to loose flow continuity. When fluid flow looses continuity or is discontinuous, cavitations can or does occur and the jet quality is elected. However, there are some water-jet applications where water discontinuity may be desirable. Nozzle assembly 200 of this invention is capable of generating rotating water jets that are discontinuous.

Figure 9:
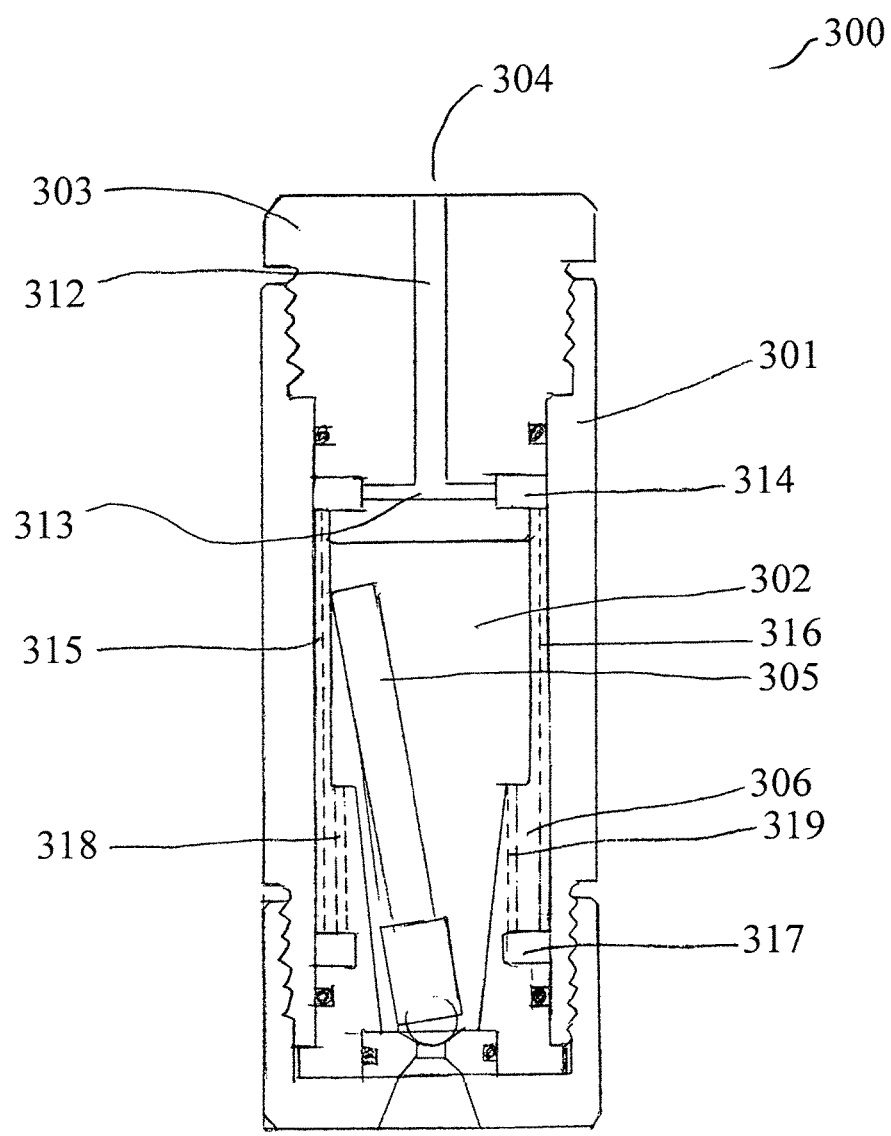
FIG. 9 is a cross-sectional view of a pivotally-rotating-jet nozzle, according to one embodiment of this invention.

Referring to FIG. 9, in some embodiments of this invention, pivotally rotating jet nozzle 300 comprises fluid inlet 304 situated or positioned on top of nozzle body 301 but the fluid is routed to or communicated with the bottom of nozzle chamber 302 through the use of on an internal sleeve 306. The purpose of this setup is to take advantage of easily introducing a pressurized fluid from the top of the nozzle assembly and yet still maintain the benefit of flow swirling of or related to a bottom-to-top fluid flow. Nozzle sleeve 396 comprises vertical outside flow passages 315 and 316 connecting fluid cavity 317 of nozzle end plug 303 to fluid cavity 317 on the bottom of sleeve 306. In some embodiments of this invention, sleeve 306 has two oppositely placed or positioned slanted fluid passages 318 and 319 linking or fluidically connecting cavity 317 to nozzle chamber 302, for example, to generate a desired swirling fluid flow. The fluid flows upward toward the top of nozzle chamber 302 and then enters into rotor 305. This swirling flow can cause rotor assembly 305 to rotate and/or pivot and also to move around nozzle chamber 302.

Figure 10:
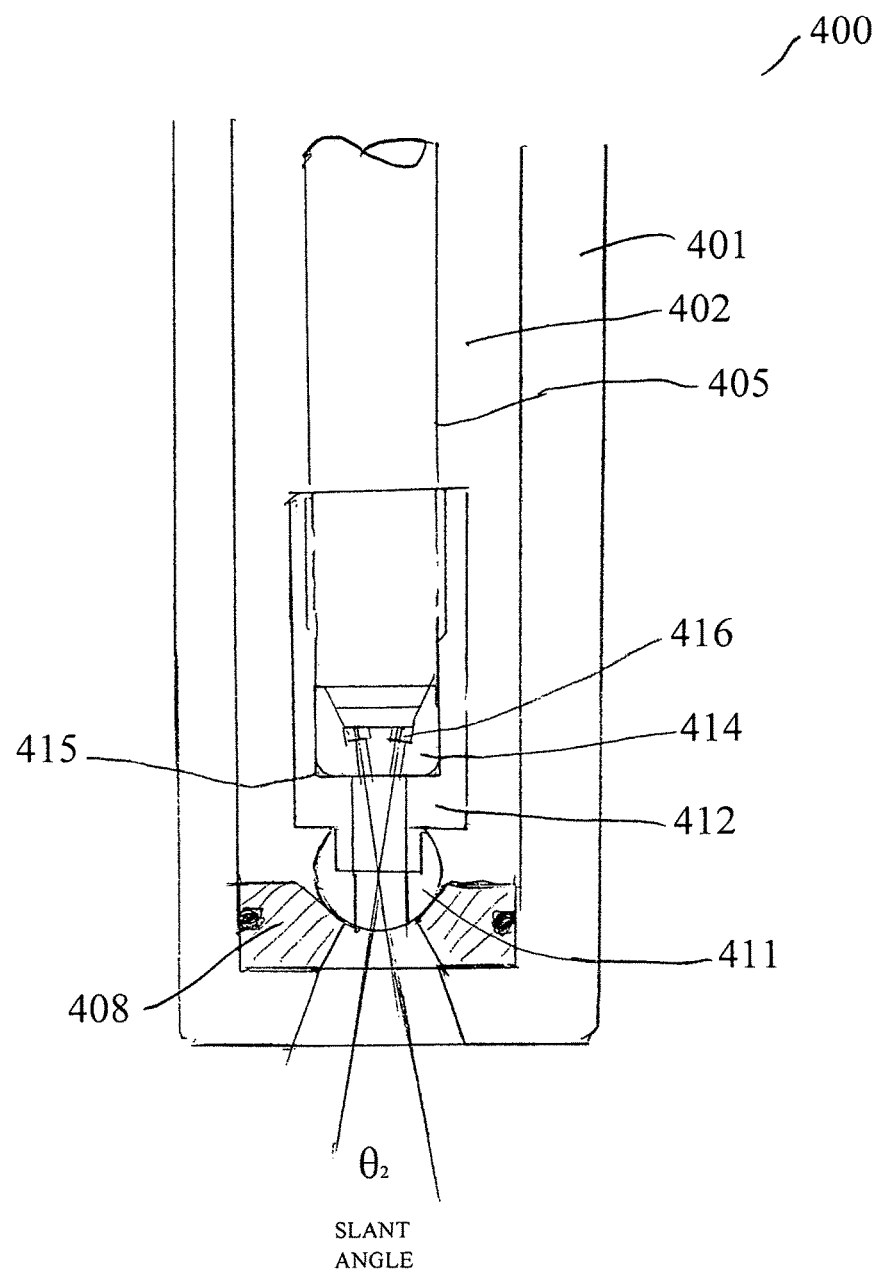
FIG. 10 is a cross-sectional view of a pivotally-rotating-jet nozzle, according to one embodiment of this invention.

Referring to FIG. 10, in some embodiments of this invention, pivotally rotating jet nozzle 400 comprises nozzle chamber 402 having fluid inlet 403 located or positioned either on the bottom of chamber 402 as with nozzle assembly 100 or on the top of nozzle chamber 402 as with nozzle assembly 200. In some embodiments of this invention, nozzle assembly 400 of this invention comprises rotor assembly 407 having ball anchor 412 mechanically attached to rotor ball 411. Rotor ball anchor 412 has central circular or cylindrical cavity 415 accommodating orifice cone 414 that has one or more jewel-quality orifices 416 installed in a straight line or in a slanted fashion at an angle to the centerline of orifice cone 414. In some embodiments of this invention, mounting a nozzle orifice in a slanted fashion increases the surface area coverage of the rotating fluid jet. If there are two slanted orifices, nozzle assembly 400 can cover even a greater area.

Figure 11:
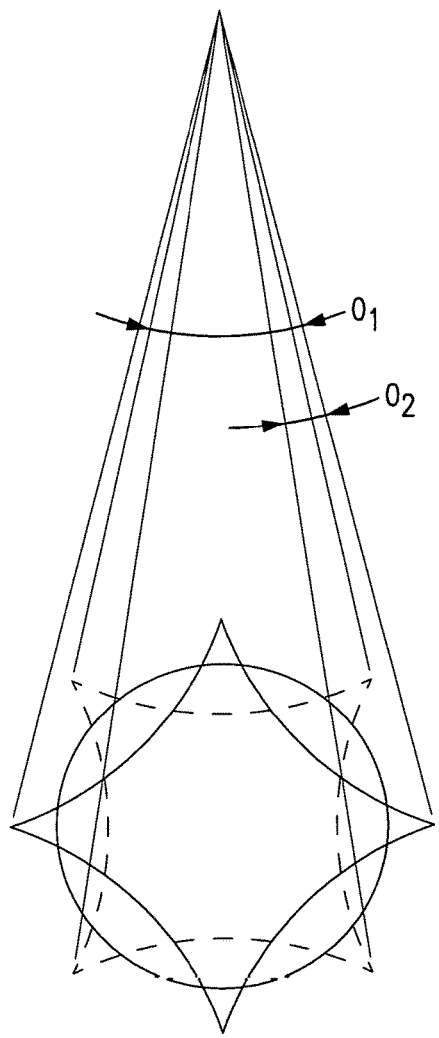
FIG. 11 shows a movement pattern of a pivotally rotating jet nozzle, according to one embodiment of this invention.
Figure 12:
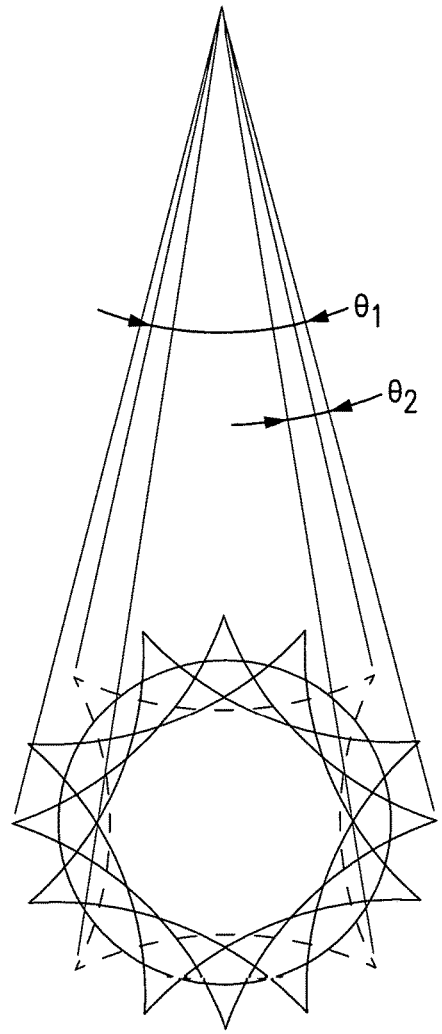
FIG. 12 shows a movement pattern of a spinning nozzle, according to one embodiment of this invention.

Referring to FIG. 11, in some embodiments of this invention, pivotally rotating jet (PRJ) nozzle assembly 100 or 200 has only one center orifice in the rotor assembly, and the spinning jet can scribe a circle on a surface when the nozzle is placed in front of the surface, even without traversing movement, regardless of how many rotations that the rotor spins or rotates per revolution inside or within nozzle chamber 102. The diameter of this circle is a function of the jet spread angle θ, and if the rotor assembly has a slanted orifice, the PRJ nozzle can scribe wavy part or partial circles, or petals, such as at one petal per rotation of rotor assembly 105. If the rotor assembly rotates 4 times per revolution inside the nozzle chamber, there will be four petals, as shown in FIG. 11. In some embodiments of this invention, slanting angle θ of the mounted orifice affects the circumference of the petals. If there are two slanted orifices mounted opposite with respect to each other in the rotor assembly, the spinning nozzle scribes eight petals, as shown in FIG. 12. The increased jet impingement area is thus clearly visible. If the rotor assembly rotates at a speed faster than 4 rotations per revolution inside the chamber, the increased surface area covered by the water jet can be even more visible. The internal diameter of nozzle chamber 102 and the diameter of rotor assembly 105 each can affect the number of rotor rotations. If the diameter of nozzle chamber 102 is 1.0 inch and rotor diameter 305 is 0.25 inches, there will be 4 rotations of the rotor per revolution inside chamber 102. In some embodiments of this invention, one or more slanted orifices in nozzle assembly 100 increases the surface coverage of the spinning jets. The benefit is particularly significant in area-sensitive water-jet applications, such as ship-hull cleaning and coating removal.

Figure 13:
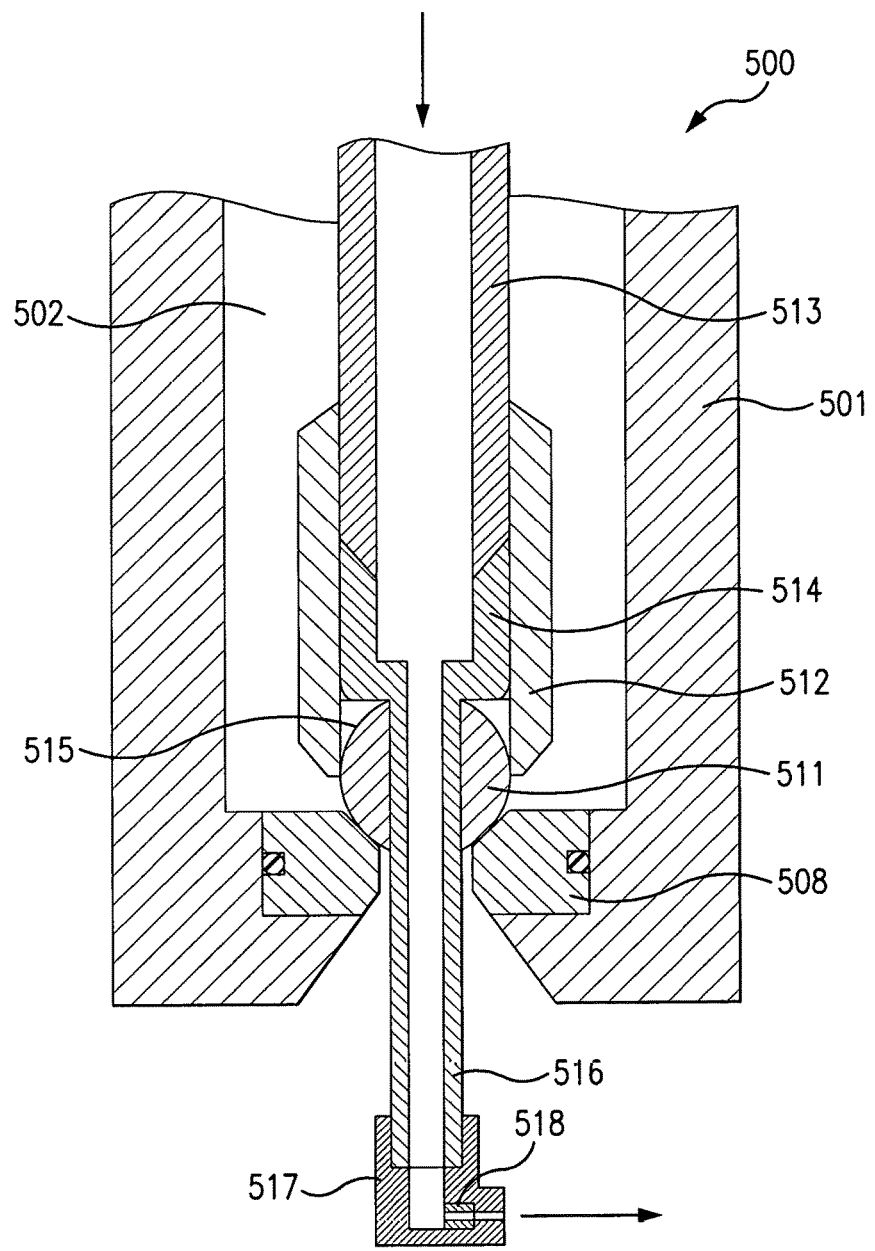
FIG. 13 shows a cross-sectional view of a pivotally rotating jet nozzle, according to one embodiment of this invention.

Referring to FIG. 13, in some embodiments of this invention, PRJ nozzle 500 is capable of generating pivotally spinning fluid jets at a sharp angle to the centerline of the nozzle assembly. Nozzle assembly 500 is similar to nozzle assembly 300 in that the fluid inlet to nozzle chamber 502 can be either on the bottom or on the top. In some embodiments of this invention, such as shown in FIG. 13, rotor assembly 505 is different because rotor assembly 505 has no orifice cone in cavity 515 but has rotor insert 514 that is sealably mated with rotor tube 513. Rotor insert 514 sits inside or is positioned within cavity 515 and extends through rotor ball 511 and nozzle seat 508, such as in the form of tube 516 extending to the outside space of nozzle assembly 500. Tube 516 is terminated with a nozzle tip 517 having a jewel-quality orifice 518. When nozzle assembly 500 is fed with a pressurized fluid, such as water, a water-jet is produced at orifice 518 that spins and rotates around in a cone-shaped pattern. In some embodiments of this invention, orifice 518 is mounted at an angle to the centerline of nozzle assembly 500 and thus the fluid jet impacts the area around nozzle assembly 500. When nozzle assembly 500 is placed inside a pipe, the water-jet can impact around the pipe wall at a short nozzle standoff distance. This capability can have significant value, such as when cleaning the interior of pipes with water-jets.

Figure 14:
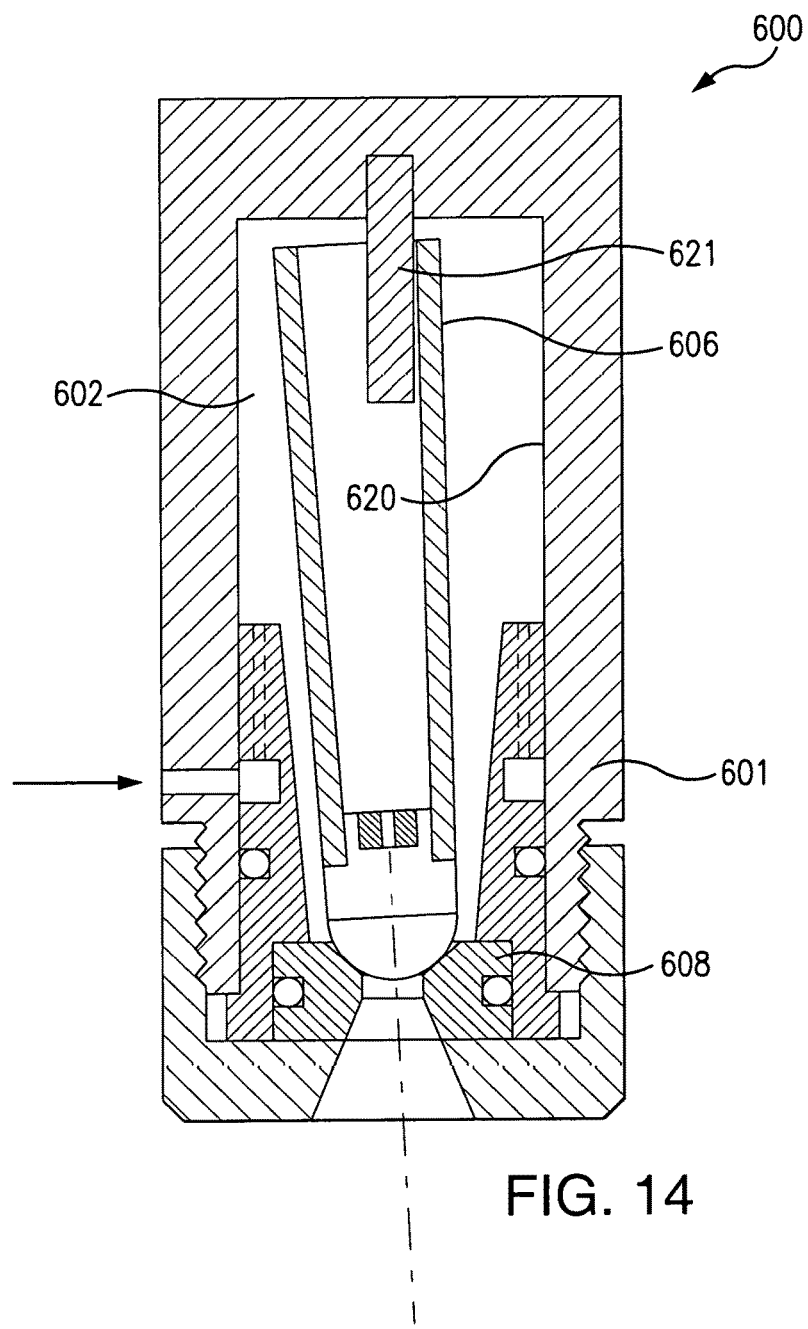
FIG. 14 shows a cross-sectional view of a pivotally rotating jet nozzle, according to one embodiment of this invention.

Referring to FIG. 14, in some embodiments of this invention, nozzle assembly 600 is designed to produce a pivotally rotating fluid jet with a controlled jet spray angle. Nozzle assembly 600 is similar in construction to nozzle assemblies 100 and 200 except that rotor assembly 620 rotates around or about a post situated inside or within nozzle chamber 602. This post controls the rotating motion of rotor assembly 606 but not interior wall 620 of nozzle chamber 602. With this post, the spread angle of the fluid jet can be controlled without requiring a change to nozzle seat 608 and/or nozzle body 601.

Figure 15:
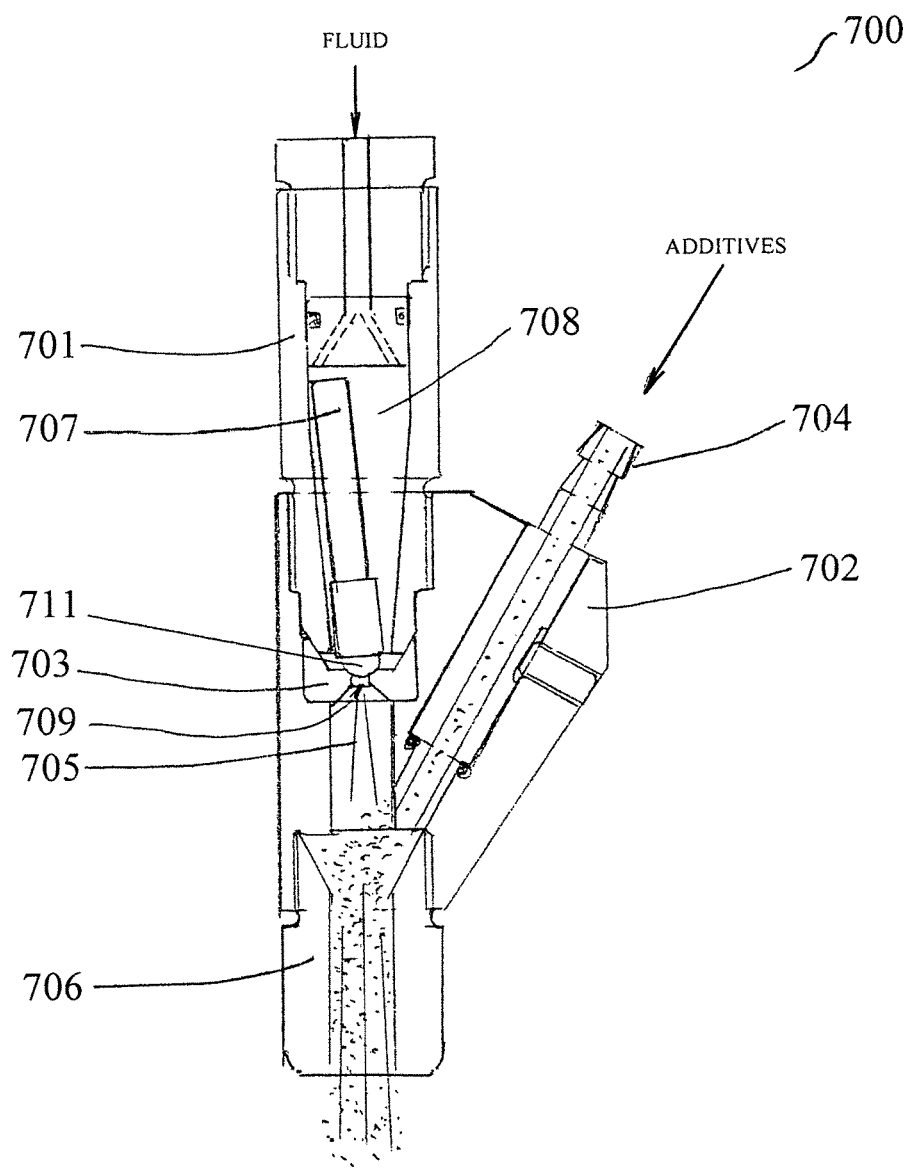
FIG. 15 shows a cross-sectional view of a nozzle assembly used to generate rotating additive-containing fluid jets, according to one embodiment of this invention.

Referring to FIG. 15, in some embodiments of this invention, nozzle assembly 700 is used to generate rotating additive-containing fluid jets. Nozzle assembly 700 comprises a pivotally spinning nozzle assembly 701 threaded into mixing body 702 and sealably in contact with nozzle seat 703, side additive feed tube 704 in communication with mixing chamber 705, and slurry nozzle 706 through which the fluid jet and additives discharge or exit together. PRJ nozzle 701 has rotor assembly 707 with rotor ball 708 in contact with center exit hole 709 of nozzle seat 703. When a relatively high-pressure fluid, such as water, enters into nozzle assembly 701, a spinning water jet is generated inside mixing chamber 705 and outside slurry nozzle 706. Due to the Venturi effect produced by the spinning water jets inside mixing chamber 705, a powerful suction is generated that can suck or draw additives into mixing chamber 705 through feed tube 704. Kinetic energy can be transferred from the water-jet to the additives and the mixture can flow out of or from slurry nozzle 706 together. If the additives selected include an abrasive powder, a powerful abrasive-laden water-jet can be generated. Because the water-jet will be spinning the abrasive water-jet from nozzle assembly 700 of this invention, it will be much more powerful than the power achieved with the device taught by U.S. Pat. Nos. 4,555,972 and 4,666,083, particularly if nozzle assembly 700 has multiple jewel orifices. The two cited prior art references use fixed multiple orifices arranged to generate converging-diverging water-jets for good energy transfer from water-jets to abrasive particles, but the water-jets are not spinning. Even so, this prior art is still used today in heavy-duty water-jet blasting applications, such as at pressures up to 50,000 psi. To increase the productivity, the nozzles can be mounted on a traversing platform and also augmented with an abrasive swivel to provide rotating capability. With nozzle assembly 700, the multiple water-jets produced can be spinning at a relatively high velocity, and thus the result can be even more effective. Comparing nozzle assembly 700 of this invention to the abrasive water-jet blasting nozzles taught in the cited prior arts shows that surface coverage can be significantly increased due to the spinning water-jets. If one or more nozzle assembly 700 is mounted on a traversing platform, it can be very productive in surface blasting applications.

Nozzle assembly 700 of this invention can be used for abrasive jet cutting applications as well if the nozzle is designed and the orifices are arranged to produce spinning jets of smaller angular spread. Such nozzle assembly can produce abrasive water-jets well-suited for geotechnical applications, such as cutting rock and concrete. In some embodiments of this invention, if the additives are materials other than abrasives, the result will be similar excellent energy transfer from the spinning water-jets to the introduced additives. Thus, nozzle assembly 700 of this invention can have applications in material mixing processes.

Figure 16:
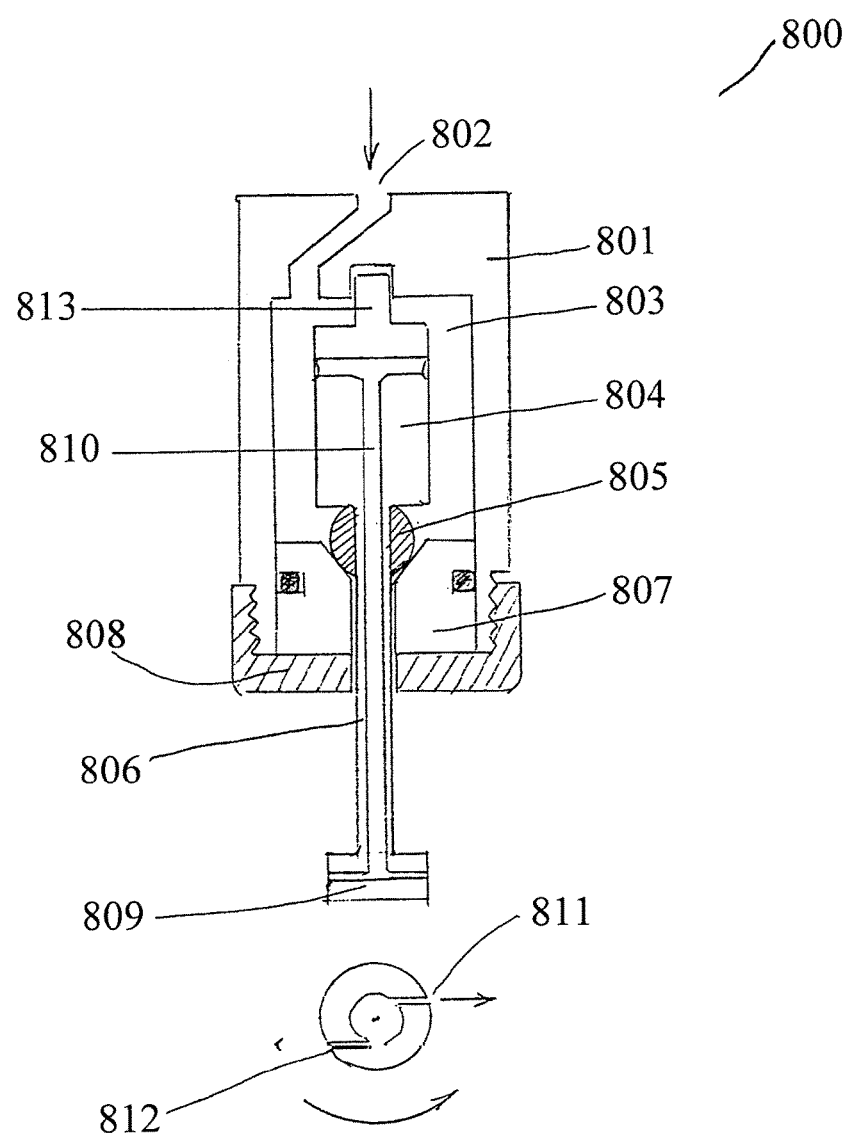
FIG. 16 shows a cross-sectional view of a self-spinning fluid jet nozzle assembly, according to one embodiment of this invention.

As shown in FIG. 16, one embodiment of this invention relates to self-spinning fluid jet nozzle assembly 800 that uses or utilizes primarily external fluid jet reactive forces and/or air to rotate or otherwise move the nozzle, such as when connected to a rotary joint, for example. In some embodiments of this invention, nozzle assembly 800 comprises rotary joint body 801 with a top or a side fluid inlet 802 and joint cavity 803, rotor assembly 804 having rotor ball 805 and rotor tube 806 extending beyond or to outside of or externally with respect to joint body 801, rotor support 807, joint end cap 808, and external fluid jet nozzle assembly 809. In some embodiments of this invention, rotor assembly 804 has central fluid passage 810 connecting, such as in fluidic communication with, joint cavity 803 and at least one of fluid jet orifices 811 and 812 at and/or of external nozzle 809. In some embodiments of this invention, fluid jet orifices 811 and 812 are opposite to each other and are offset from the center of nozzle assembly 809, for example, to generate one or more air-jet reactive forces and/or torques around or about nozzle assembly 809. In some embodiments of this invention, the torque is substantial when the fluid pressure is relatively high so that there may be no need to generate swirling fluid flow inside joint cavity 803. In some embodiments of this invention, there is a need to center and/or support the rotation of rotor assembly 804. A centering post, such as centering post 621 as shown in FIG. 14 and/or centering post 813 shown as a part of rotor assembly 804 shown in FIG. 16 can be used for this purpose. In some embodiments of this invention, rotary joint assembly 800 of this invention is physically relatively small, for example so it can be inserted into relatively small tubes and/or pipes, for example, to clean an interior surface with high-pressure fluid jets. For example, currently, water-jets are often used to clean heat exchanger tubes.

Figure 17:
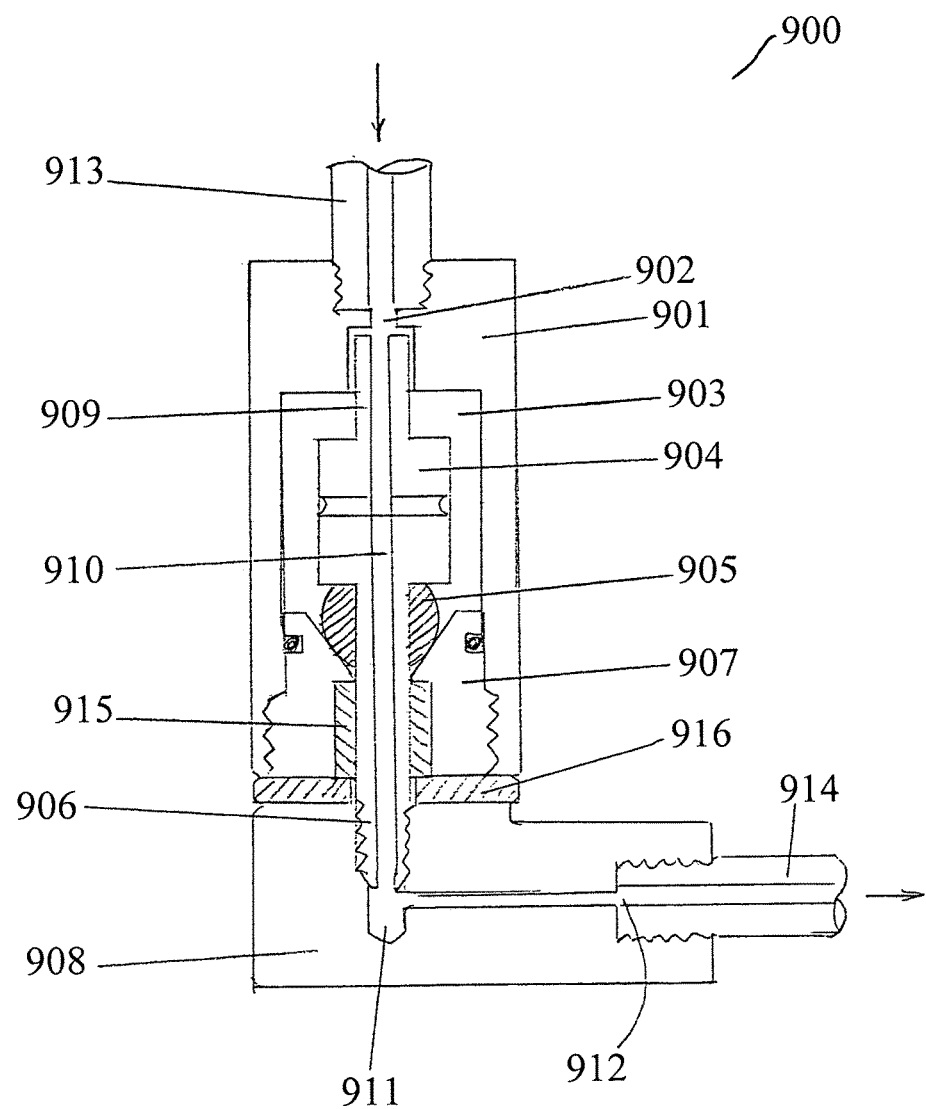
FIG. 17 shows a cross-sectional view of a rotary joint assembly, according to one embodiment of this invention.

FIG. 17 shows another embodiment of this invention, which relates to rotary joint assembly 900, which can be used to provide articulation to rigid tubes, for example, in transporting relatively high-pressure fluid in a fluid power system. Conventional rotary joints of this type for relatively low fluid pressures are on gasoline pump nozzles such as at filling stations. The ability for the rotary joint to provide 3-dimensional relative movement to rigid tubing and stiff hose is desirable in known water-jet processes, particularly those that use automatic robots and/or computer controlled water-jet nozzles. As water pressures are steadily raised higher and higher, the design of a suitable rotary joint becomes more difficult, for example, because a seal gripping force on a rotating shaft becomes a problem and polymeric seals are often used in rotary joints. In known water-jetting processes, pressurized water is transported from a pump to the nozzle, for example, which can be located and mounted at a tip of a robotic arm and/or on top of a gantry cutting table. To follow movement of the nozzle, the water tube or other supply line needs to move accordingly and smoothly. Thus, in some embodiments of this invention, articulating joints meet this need. This invention provides such articulating joints, for example, because there are no polymeric dynamic shaft seals in the apparatus of this invention.

Still referring to FIG. 17, rotary joint assembly 900 of this invention is similar to rotary joint assembly 800 shown in FIG. 16, except that external nozzle assembly 809 is replaced with a second joint body. Rotary joint assembly 900 of this invention comprises first joint body 901 having fluid inlet 902 and cavity 903, rotor assembly 904 situated or positioned inside cavity 903 comprising rotor ball 905 and rotor tube 906, rotor support 907, and second joint body 908 connected to rotor tube 906, for example in a fluid tight manner or fashion. In some embodiments of this invention, rotor assembly 904 comprises centering post 909 inside or positioned within cavity 903. In some embodiments of this invention, centering post 909 comprises a central fluid passage in communication with fluid inlet 902 and central fluid passage 910 of rotor assembly 904. In some embodiments of this invention, second joint body 908 comprises fluid cavity 911 in fluidic communication with fluid passage 910 of rotor assembly 904 and outlet 912 of second body 908. When a pressurized fluid enters into joint cavity 903 through tube 913 and inlet 902, the pressurized fluid forces or otherwise moves or pushes rotor assembly 904 against or in a direction toward rotor support 907 and simultaneously flows into passage 910 and cavity 911 and then flows out of or discharges from outlet 912. In some embodiments of this invention, connecting tube 914 carries the fluid from second body 908 to another distant fluid system component, which for example could be another rotary joint. Because of the smooth contact between rotor ball 905 and rotor support 907, second joint body 908 can rotate freely against joint body 901, particularly without fluid leakage occurring at or near that location. The absence of conventional polymeric seals around rotor tube 906 makes possible easy rotation. In some embodiments of this invention, plastic bushing 915 and plastic disk 916 further facilitate and support the rotation or other similar movement. Joint bodies 901 and 908 are free to rotate against and/or with respect to each other. There is no need to define the fluid inlet and outlet. A pressurized fluid is free to flow in either direction, upstream or downstream. In some embodiments of this invention, an articulating movement defines the fluid inlet and the fluid outlet, for example, in a tubing or piping system.

Figure 18:
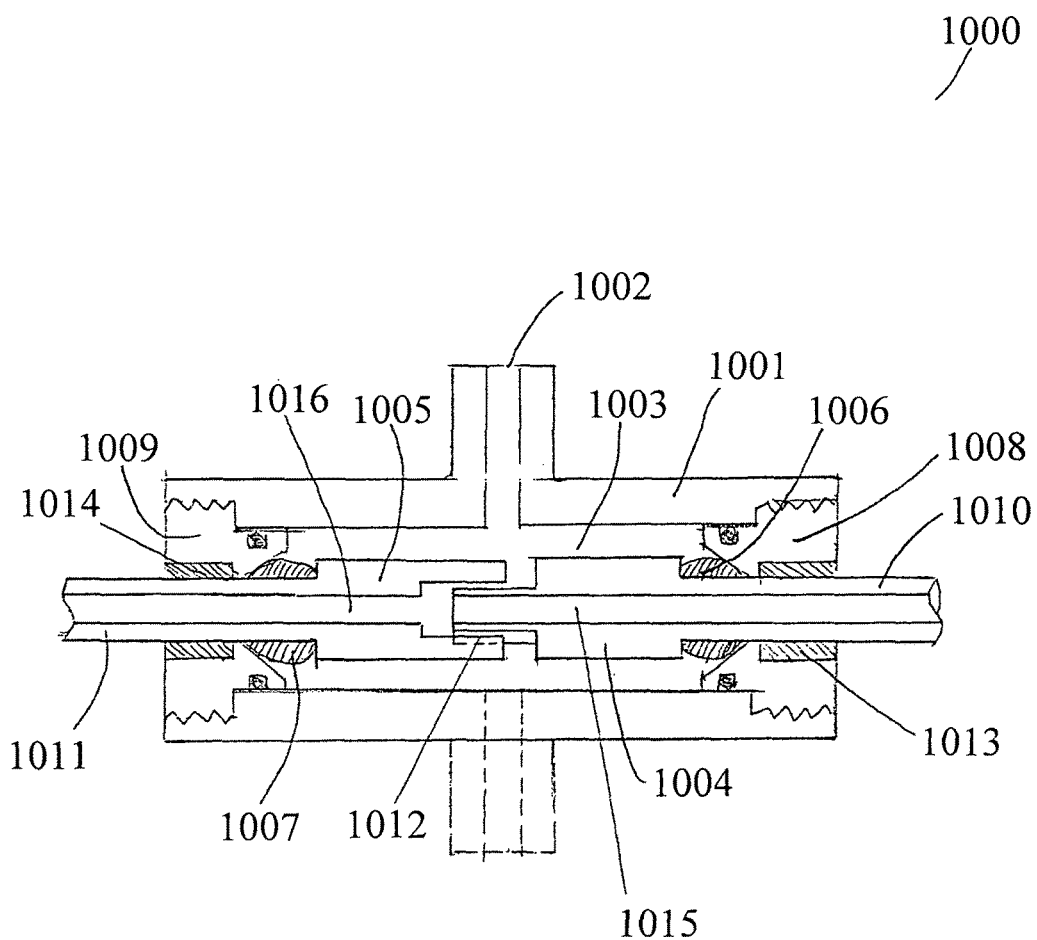
FIG. 18 shows a cross-sectional view of a rotary joint assembly having two sets of rotor assemblies, according to one embodiment of this invention.

FIG. 18 shows a still further embodiment of this invention, rotary joint assembly 1000 that can serve multiple purposes by having two sets of rotor assemblies positioned within or mounted inside a single joint cavity. In fact, the same joint cavity can accommodate more than two sets of rotor assemblies, for example, to produce a fluid jet system capable of cleaning the interior of tanks, vessels, and large pipes. A multiplicity of self-spinning fluid jets can be generated at desired locations on rotary joint assembly 1000 and aimed toward or at any suitable desired direction. Rotary joint assembly 1000 as shown in FIG. 18 relates to a dual rotor assembly unit comprising joint body 1001 having fluid inlet 1002 and cavity 1003, two oppositely placed rotor assemblies 1004 and 1005 with corresponding rotor balls 1006 and 1007, and their respective rotor supports 1008 and 1009. In some embodiments of this invention, rotor assemblies 1004 and 1005 have their respective rotor tubes 1010 and 1011 extending past or beyond joint body 1001. In some embodiments of this invention, rotor assemblies 1004 and 1005 are aligned to structurally support each other in rotation but are also free to slide or are locked together with a locking key 1012 to rotate as a single unit. Joint assembly 1000 of this invention can also comprise bushings 1013 and 1014 for supporting rotor tubes 1010 and 1011.

Still referring to FIG. 18, when a pressurized fluid enters into joint cavity 1003, the pressurized fluid forces and or otherwise pushes or moves rotor assemblies 1004 and 1005 against their respective support 1008 and 1009 and at the same time flows through passages 1015 and 1016 to system components such as nozzles connected to respective rotor tubes to generate self spinning fluid jets. In some embodiments according to this invention, when the two rotor assemblies are locked together with the locking key 1012, an external torque can be applied to one rotor assembly and the other rotor assembly will then rotate accordingly. In this case, rotary joint assembly 1000 of this invention is now a powered rotary joint that is commonly found in conventional water-jet systems. Conventional air motors are common sources of power. When rotary joint 1000 is used in a powered manner or case, one of the rotor tubes can be a solid rod to accommodate the applied torque while the other rotor tube can send or otherwise deliver the pressurized fluid to a rotating nozzle to generate rotating fluid jets. Powered rotary joint 1000 of this invention can be made much smaller than conventional units and can be advantageous in many fluid jet applications.

Figure 19:
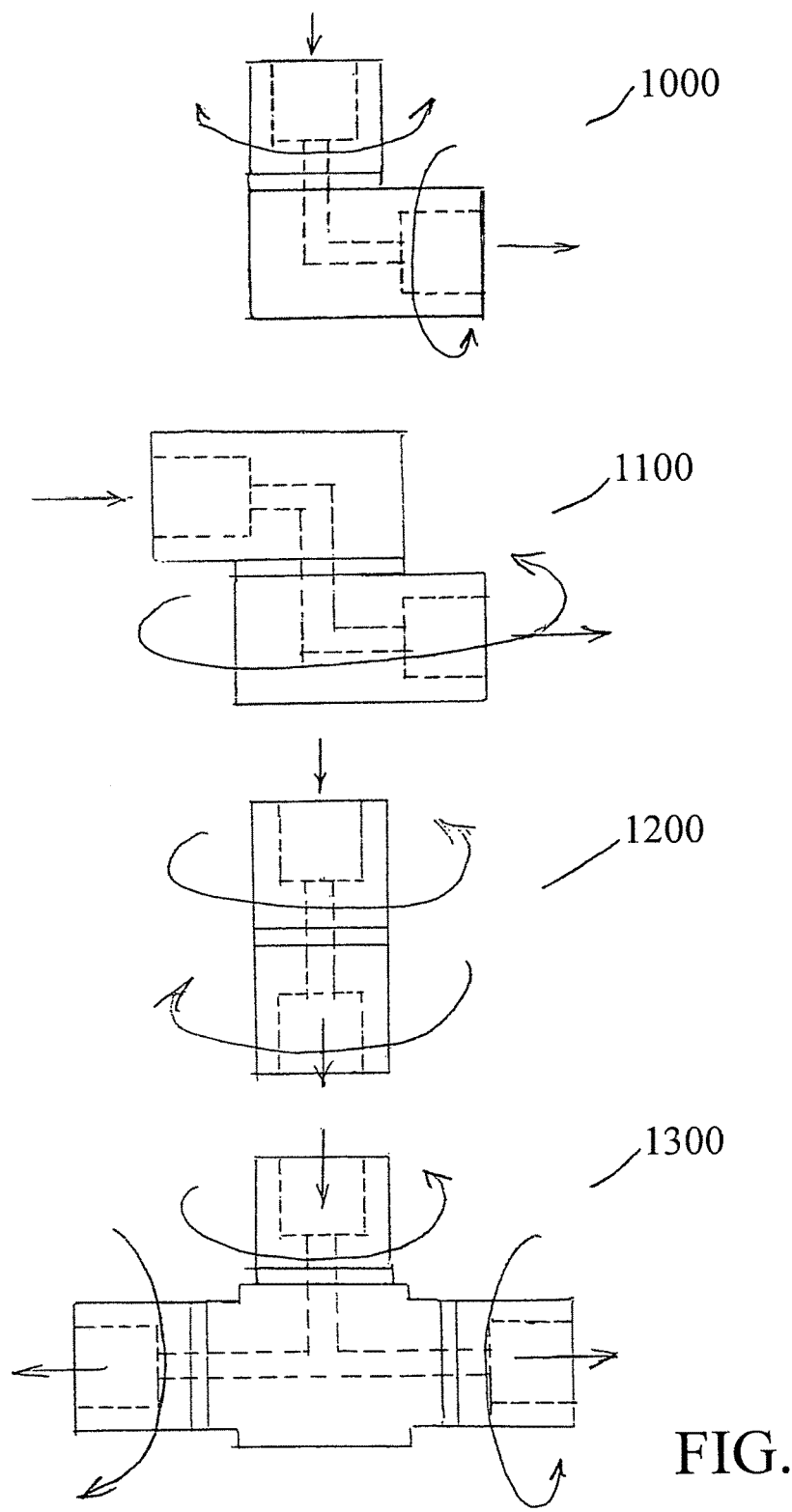
FIG. 19 shows a cross-sectional view of a rotary joint, according to one embodiment of this invention.

FIG. 19 shows one embodiment of the rotary joint of this invention which can be configured in many different ways to provide rotary motions, for example, as needed in a pressurized fluid system, particularly in conventional pressure water-jet systems. This basic concept can be applied to produce rotary joints in the form of an elbow, such as joint assembly 1000, a parallel-disk unit such as joint assembly 1100, an inline swivel such as joint assembly 1200, and/or a multiple 3-dimensional joint such as joint assembly 1300. A similar concept can be applied to generate powered rotating fluid jets or self-spinning fluid jets. This versatility is extremely beneficial in conventional water-jet system operations.

Figure 20:
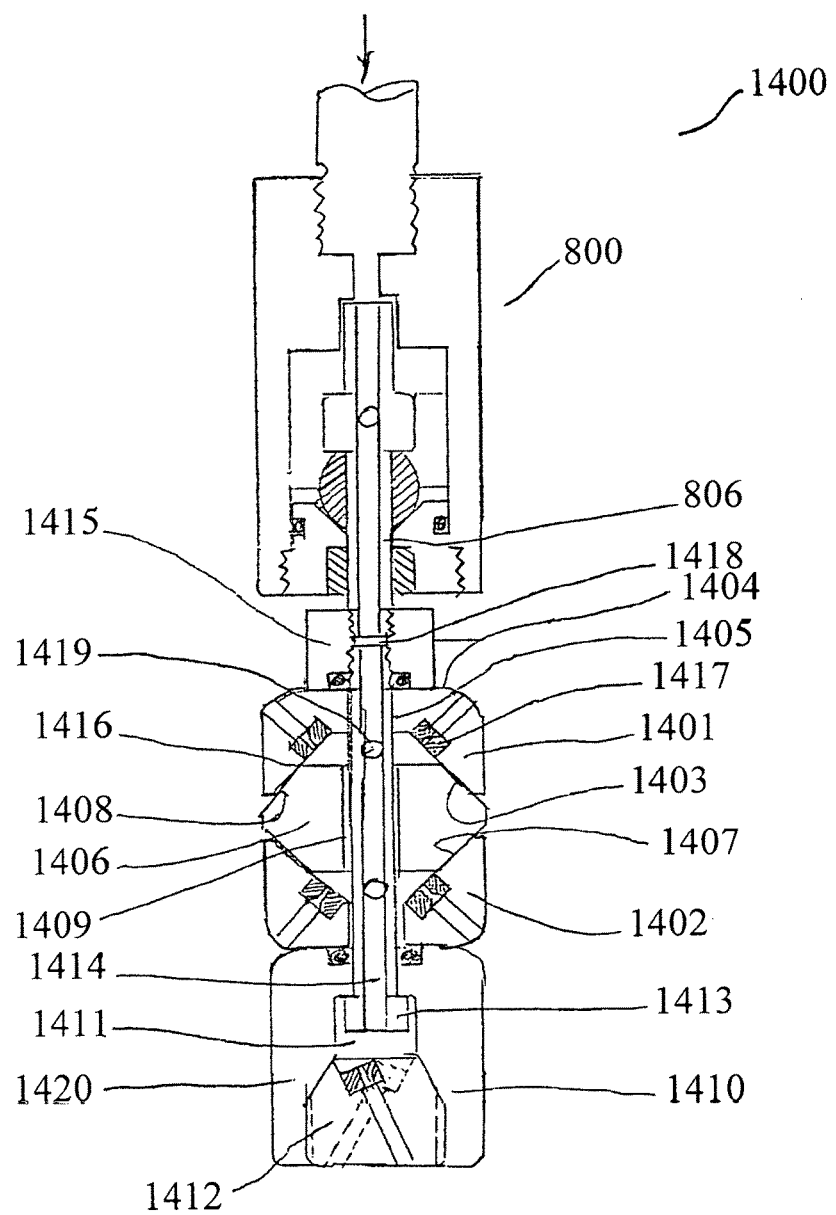
FIG. 20 shows a cross-sectional view of a fluid jet nozzle assembly, according to one embodiment of this invention.

FIG. 20 shows a still further embodiment of this invention which relates to a fluid jet nozzle assembly, for example particularly suited for generating a fluid jet at very high pressures, such as to clean the interior of tubes, pipes, and/or vessels. This nozzle assembly is particularly suited for use with rotary joints of this invention and/or with suitable conventional rotary joints, to generate either powered or self-spinning multiple fluid jets. The nozzle assembly of this invention can be made in tubular forms, for example, small enough to fit inside or be positioned within small tubes and pipes and to be moved along their length. Because this embodiment of the nozzle assembly can have multiple frontal, forward and backward fluid jets and can spin inside a pipe, its cleaning capability is apparent. In some embodiments of this invention, jewel orifices can be used to further assure the quality and durability of the fluid jets, particularly at relatively high pressures. Conventional small tube cleaning nozzles use drilled metal orifices known to produce inferior fluid jets and that have relatively short life times, particularly at relatively high pressures. Larger nozzles that use jewel orifice mounted on individual set screws are unsuited for small tubes and are not versatile for different applications.

FIG. 20 shows another embodiment of nozzle assembly 1400, of this invention, connected to rotary joint 800, and comprises one or more orifice cones 1401 and 1402 having concave face 1403 and flat face 1404 and center hole 1405, mating cone 1406 having two convex faces 1407 and 1408 and center hole 1409, front nozzle head 1410 having cavity 1411 to accommodate threaded-in nozzle holder 1412 and tie rod 1413 having end-to-end fluid passage 1414, and coupler 1415. The orifice cones can be identical or different with respect to the concave surface angle to the centerline, the number of jewel orifices, and the angular position of the jewel orifices. According to this invention, the jewel orifices can have different selected orifice sizes. The concave surface of both orifice cones each mates with the convex surface of mating cone 1416 in such a way that metal-to-metal sealing is accomplished at front edge 1416 of the mating cone. Jewel orifice 1417 and others, according to some embodiments of this invention, are made of sapphire, ruby, diamond and/or any other suitable relatively hard jewel stones and each orifice is precisely sized and polished for generating coherent fluid jets. In some embodiments of this invention, the jewel orifices are cemented or otherwise adhered in a precise position and are sized cavities with an exit or discharge hole for existing or discharging the fluid jet. During assembly, tie rod 1314 is sent through the nozzle head, front orifice cone 1402, mating cone 1406, backward orifice cone 1401, and is engaged to coupler 1415 by threads. Coupler 1415 has central passage 1418 that receives or accepts pressurized fluid from the pump through a tube or hose and sends or transmits the fluid to all the orifices of nozzle assembly 1400. In some embodiments of this invention, tie rod 1413 has side holes 1419 to allow communication of or to transport the fluid. The pressurized fluid can also flow into front cavity 1411 and out of jewel orifice 1420, for example, in the form of one or more front jets. In some embodiments of this invention, all or part of fluid jets of this nozzle assembly can be centered with respect to the centerline or can be offset to generate reactive forces with air to spin, force and or otherwise move the nozzle assembly, for example, if a rotary joint is attached.

Mounting jewel orifices in an orifice cone with a concave sealing surface is taught by U.S. Pat. No. 4,765,540 and is extensively applied in high-pressure water-jet processes with great success. The simplicity and versatility of this design is one attraction. However, the idea of tying several orifice cones together with a central tie rod is not conventional and is not taught by the prior art. With a central tie rod, multiple orifice cones of different design can be mated into a single unit to serve multiple tasks. This feature is useful in cleaning, for example, the interior of pipes, tanks, and/or vessels.

Still referring to FIG. 20, a suitable rotary joint for use with nozzle assembly 1400 of this invention is rotary joint 800 of this invention, such as shown in FIG. 16. Rotary joint 800 comprises rotor assembly 804 that is free to spin or rotate inside or within cavity 803 when a spinning force is applied to rotor tube 806. By connecting rotor tube 806 to coupler 1415, rotary joint 800 will allow nozzle assembly 1400 to rotate according to the reactive forces provided by the fluid jets.

Figure 21:
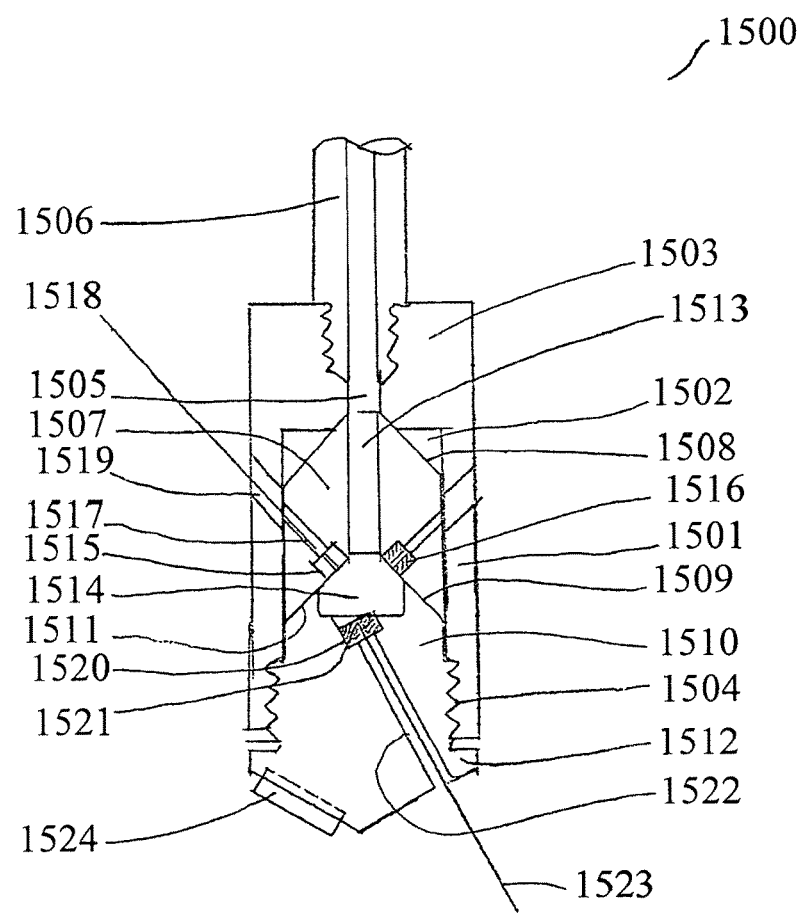
FIG. 21 shows a cross-sectional view of a nozzle assembly, according to still another embodiment of this invention.

FIG. 21 shows a still further embodiment of this invention which relates to nozzle assembly 1500 that is similar to nozzle assembly 1400 but simplified. Nozzle assembly 1500 comprises nozzle body 1501 having cylindrical cavity 1502 with closed end 1503 and threaded open end 1504, fluid inlet 1505 on the closed end in communication with fluid inlet tube 1506, backward-jet orifice cone 1507 having convex end 1508 in fluid-tight contact with fluid inlet 1505 and concave end 1509, and nozzle head 1510 having convex end 1511 mating with concave end 1509 of orifice cone 1507 and threaded other end 1512 engaging open end 1504 of nozzle body 1501 and exposing to the atmosphere. All contacting convex and concave surfaces are shaped to form a fluid-tight, for example, metal-to-metal seal when the nozzle assembly is assembled and pressurized, thus eliminating the need for polymeric seals. This feature of this invention provides for nozzle assemblies of relatively small sizes and for use at relatively high fluid pressures.

Still referring to FIG. 21, orifice cone 1507 has central fluid passage 1513 in communication with the fluid inlet and with cavity 1514 of convex end 1511 of nozzle head 1510. In some embodiments of this invention, concave end 1509 of the orifice cone has one or more cylindrical orifice cavities 1515 precisely made with selected dimensions, angular and circumferential positions to accommodate selected jewel orifice 1516. Each orifice cavity has fluid exit hole 1517 for generating any desired or otherwise suitable fluid jet 1518, for example, as aimed toward a rear of the nozzle assembly. In some embodiments of this invention, the fluid exit hole is in-line with fluid jet hole 1519 on the nozzle body. In some embodiments of this invention, cavity 1514 on the convex end of the nozzle head has one or more precisely made jewel orifice cavities 1520 for mounting jewel orifices 1521 and for generating frontal fluid jets 1523 of selected characteristics through fluid jet exit hole 1522. The nozzle head can have any suitable or specially shaped front end and can have suitably shaped or designed mounted cutters 1524 to facilitate the removal of frontal obstacles.

Still referring to FIG. 21, in some embodiments of this invention, nozzle assembly 1500 is a simplified version of nozzle assembly 1400 in which the central tie-rod is replaced with a cylindrical nozzle body to assemble the orifice cone and the nozzle head. The forward-jet orifice cone of nozzle assembly 1400 is combined with the nozzle head. This is necessary when the nozzle assembly is relatively small and needs or requires relatively high pressure capability. A relatively small nozzle assembly 1500 can easily generate four backward fluid jets, for example, at different angular positions and three to four frontal fluid jets of selected positions. When attached to a rotary joint, such as rotary joint 800 of this invention, nozzle assembly 1500 can spin or rotate at a relatively high speed when a pressurized fluid, such as water, is introduced and when the jets are offset from the center or centerline, for example, to enhance the jet/air reactive forces. In some embodiments of this invention, the water-jets can perform multiple tasks including cleaning the interior of tubes, pipes and/or vessels, for example, in water-jet processes. Nozzle assembly 1400 and 1500 of this invention can also be spun or rotated with a powered rotary joint and a fluid transport tube. In some embodiments of this invention, nozzle assembly 1400 and 1500 represent a relatively versatile fluid jet nozzle system that can significantly improve the performance of current water-jet processes.

EXAMPLE I

A pivotally rotating jet nozzle assembly was constructed according to nozzle assembly 100 of this invention. The nozzle body is made of hardened stainless steel and is 1.4 inches wide and 2.4 inches tall having a cylindrical cavity of 0.75 inches in diameter and 2.10 inches in depth. A mating nozzle cap was also made of hardened stainless steel and was attached to the nozzle body by 1-1/8-12 threads. A rotor assembly was assembled using a 5 mm diameter tungsten-carbide ball hard soldered to a stainless-steel ball anchor of 0.31 inches in diameter and 0.5 inches in length. A 0.25-inch-diameter stainless-steel tube was threaded into this ball anchor and butted against an orifice plug having a jewel orifice of selected size. The overall length of this assembled rotor assembly was 2.0 inches. The rotor ball has a 0.079-inch-diameter center hole and the orifice plug had a jewel orifice of 0.040 to 0.048 inches. The nozzle seat was made of hardened stainless-steel and was 0.500 inches in diameter and 0.200 inches in thickness. The nozzle seat was provided with a 0.079-inch-diameter center hole of various entry taper, ranging from 60 degrees to 110 degrees. This nozzle assembly had an internal rotor guide cylinder made of brass and two opposite fluid passages slanted at 60 degrees. When assembled and connected to a water source, this nozzle assembly produced a rotating water-jet at 70-psi tap pressure. The rotation was very smooth albeit not very fast. When this nozzle assembly was connected to a 1800-psi water source, a rotating water jet of high frequency was produced. Using a camera at various shutter speed, it was estimated that nozzle rotor assembly was rotating at about 20 revolutions per second and about 3 revolutions around the nozzle chamber every orbital circle. It was clear that the rotor assembly was rotating on its own axis and also orbitally rotating around the nozzle chamber with the rotor ball pivoting against the nozzle seat.

EXAMPLE II

A relatively small rotary joint was constructed according to rotary joint 800 of this invention. The joint body was 0.375 inches in outside diameter, 2.0 inches in length and had a cavity of 0.281 inches in diameter housing a rotor assembly made with a 0.250-inch-diameter hardened stainless-steel ball having a 0.156-inch-diameter center hole accommodating a rotor tube assembly made of stainless steel. The rotor tube assembly had a body of 0.250 inches in diameter and a 0.156-inch-diameter tube extended to the exterior of the nozzle body. The rotor tube body had a short center post of 0.125 inches in diameter positioned in a hole made on the closed end of the joint cavity that also served as the fluid inlet. The total length of the rotor assembly was 2.0 inches and had a through center fluid passage of 0.079 inches in diameter. The exposed rotor tube end was threaded and fitted with a relatively small nozzle having two 0.035-inch-diameter orifices offset from the center or center line to provide counterclockwise rotation from or induced by the jet/air actions. The rotor ball support had a 90-degree smooth tapered hole that fit the rotor ball very well and was threaded into the joint cavity. There was no joint cap. An o-ring seal was fitted with the rotor ball support. When a water source of 1500 psi was connected to this rotary joint, the dual-jet nozzle rotated readily driven by the forces created by or between the water jets and the air. The rotating speed was estimated at 10 to 30 rotations per second. There was no fluid leakage at the rotor ball.

EXAMPLE III

A nozzle assembly according to nozzle assembly 1500 of this invention was constructed. The nozzle body was 0.375 inches in outside diameter, 2.0 inches in length, and had a cavity of 0.272 inches in diameter and was made of hardened stainless steel. The orifice cone was made of stainless steel having 0.270 inches in outside diameter, 90-degree convex and concave faces, and a center fluid passage of 0.078 inches in diameter. There were two jewel orifices mounted on opposite sides of the concave face of the orifice cone at 45 degrees to the center line and offset by 20 degrees to force or generate counterclockwise rotation. The orifices were made of sapphire and had a center hole of 0.023 inches in diameter. The nozzle head was made of hardened stainless steel and had three 0.023-inch-diameter jewel orifices made of sapphire as well. These three orifices were positioned in a triangle and were all facing forward but at different angles. These angles were determined by examining the circles the fluid jets would make on the front face of the nozzle upon rotation. The three jets should cover the entire face in front of the nozzle body. For a 0.375-inch-diameter nozzle body, the three jets of the nozzle head turned out to be roughly 30 degrees, 18 degrees, and 0 degrees. At such angular positions, the three frontal jets washed out the entire frontal face of the nozzle body. This nozzle assembly was connected to a 0.375-inch-diameter stainless steel tube and was fed with 1500-psi water to generate five water-jets, two backward and three forward. When an air-motor-driven rotary joint was attached to the feed tube, the nozzle rotated and the five jets demonstrated relatively good jet actions inside a test pipe. The two backward jets washed out debris and forced or pulled the nozzle forward. When a brick was positioned in front of the nozzle, the three frontal water jets drilled a round hole of about 0.5 inches in diameter. It appeared that this nozzle assembly would do a relatively good job in cleaning pipes, for example, as small as 0.5 inches in inside diameter.

What is claimed is:

1. A nozzle assembly apparatus for generating self-spinning fluid jets, the apparatus comprising:
    a nozzle body having a cylindrical nozzle cavity, an inlet, an outlet, a tubular nozzle rotor assembly centrally positioned with respect to said nozzle cavity, said nozzle rotor assembly having a ball end and a tubular end and a central fluid passage passing entirely through the nozzle rotor assembly, a fluid swirl enhancer in communication with said inlet, a replaceable nozzle seat in communication with said ball end of said nozzle rotor assembly and with said outlet, said ball end of said nozzle rotor assembly pivoting, oscillating, and rotating against said nozzle seat when pressurized fluid flows through said nozzle assembly, said tubular nozzle rotor assembly comprising a hard highly polished rotor ball soldered or mechanically attached to a cylindrical holder having a holder cavity, a hollow tube threadedly attached to said cylindrical holder, and an orifice plug or orifice cone positioned within said holder cavity in communication with said hollow tube in a sealable manner.

2. An apparatus according to claim 1 wherein said outlet comprises said nozzle seat having a central tapered hole in communication with said ball end of said nozzle rotor assembly and said outlet is positioned at a first end of said nozzle cavity and said inlet is positioned at a second end of said nozzle cavity.

3. An apparatus according to claim 2 wherein pressurized fluid enters into said nozzle cavity through said inlet and through a swirl enhancer, and the pressurized fluid is divided into two separated streams that flow into said nozzle cavity on opposite sides and at an angle with respect to a centerline of said nozzle cavity to generate a swirling fluid flow inside said nozzle cavity in a clockwise or a counterclockwise flow pattern.

4. An apparatus for generating additive-containing fluid jets, the apparatus comprising:
    the nozzle assembly according to claim 3 attached to an additive injection and mixing chamber having a feed tube for introducing a selected additive from an outside to said mixing chamber, and a slurry nozzle in line with said outlet of said fluid jet nozzle assembly and in communication with said mixing chamber.

5. An apparatus according to claim 4 wherein said pressurized fluid enters into said fluid jet nozzle assembly and generates self-spinning high-speed fluid jets into said mixing chamber and exits through said slurry nozzle to generate sufficient suction to draw additives into said mixing chamber through said feed tube and to transfer energy from the fluid jets to said introduced additives.

6. An apparatus according to claim 5 wherein said additive is a particulate matter such as a powdered abrasive.

7. An apparatus according to claim 5 wherein said additive is a fluid or a slurry.

8. An apparatus according to claim 1 wherein said inlet is located at a side of said nozzle cavity and near said outlet.

9. An apparatus according to claim 8 wherein pressurized fluid enters into said nozzle cavity through said inlet and through a swirl enhancer, and the pressurized fluid is divided into two streams that enter into said nozzle cavity on opposite sides and at an angle to a centerline of said nozzle cavity to generate a clockwise or a counterclockwise flow pattern.

10. An apparatus according to claim 1 wherein said rotor ball and said attached holder have a central fluid passage in line with a centerline of said orifice plug or orifice cone inside said holder cavity.

11. An apparatus according to claim 10 wherein said orifice plug or orifice cone has at least one jewel-quality nozzle orifice for generating high-speed fluid jets and said orifice plug or orifice cone is replaceable.

12. An apparatus according to claim 1 wherein said holder extends through said rotor ball in a form of a tube beyond said nozzle assembly and said orifice plug or orifice cone is contained in a separate assembly attached to an outside end of said tube.

13. An apparatus according to claim 1 wherein said nozzle rotor assembly avoids contact with a wall of said nozzle cavity in a movement as a center post positioned within said tubular end of said rotor assembly and said center post is attached to said swirl enhancer at an other end.

14. A rotary joint apparatus for providing rotary flexibility in transporting fluid with a hose, a tube, and/or a pipe system and avoiding entanglement and facilitating an orderly system operation, the apparatus comprising:

a rotor assembly coupling a first joint body to a second joint body and allowing said first joint body and said second joint body to rotate freely against each other without fluid leakage, said first joint body and said second joint body each having a cylindrical cavity, a fluid inlet, a threaded outlet threadedly engaged with a threaded plug supporting a rotor ball of said rotor assembly with a tapered center hole, said rotor assembly positioned within said cavity having a rotor body and a rotor tube extending through said rotor ball and said threaded plug to threadedly engage said second joint body, said cylindrical cavity of said second joint body in communication with said cylindrical cavity of said first joint body through said rotor tube, a fluid outlet in communication with said cavity of said second joint body, a shaft bushing supporting said rotor tube in said threaded plug, and a gasket positioned between said first joint body and said second joint body to facilitate rotation.

15. A rotary joint apparatus according to claim 14 wherein said rotor assembly is centered within said cavity with a centering post on said rotor body to support said rotor assembly during movement.

16. A rotary joint apparatus according to claim 15 wherein said fluid inlet is in line with said fluid outlet.

17. A rotary joint apparatus according to claim 15 wherein said fluid inlet is parallel to said fluid outlet.

18. A rotary joint apparatus according to claim 15 wherein said fluid inlet is perpendicular to said fluid outlet.

19. A rotary joint apparatus according to claim 15 wherein said first joint body is combined with said second joint body to form a single joint body with a single cavity that houses two opposing rotor assemblies each having a rotor body, a rotor ball, a rotor tube, and a rotor support threaded into two ends of said cavity of said joint body, and said cavity having a fluid inlet.

20. A rotary joint apparatus according to claim 19 wherein said two opposing rotor assemblies support each other within said cavity on one end and have an other end extending outside said joint cavity.

* * * * *